United States Patent
Do et al.

(10) Patent No.: US 11,706,261 B2
(45) Date of Patent: Jul. 18, 2023

(54) ELECTRONIC DEVICE AND METHOD FOR TRANSMITTING AND RECEIVING CONTENT

(71) Applicant: Samsung Electronics Co., Ltd., Suwon-si (KR)

(72) Inventors: Taewon Do, Suwon-si (KR); Yongtae Kim, Suwon-si (KR); Hoonjae Lee, Suwon-si (KR); Hyeyoung Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/240,159

(22) Filed: Apr. 26, 2021

(65) Prior Publication Data

US 2022/0006843 A1 Jan. 6, 2022

(30) Foreign Application Priority Data

Jul. 2, 2020 (KR) .................. 10-2020-0081503

(51) Int. Cl.
*H04L 65/1066* (2022.01)
*H04L 65/10* (2022.01)
(Continued)

(52) U.S. Cl.
CPC ...... *H04L 65/1066* (2013.01); *H04L 65/1013* (2013.01); *H04N 21/2402* (2013.01); *H04N 21/4621* (2013.01); *H04N 21/6437* (2013.01)

(58) Field of Classification Search
CPC ............ H04L 65/1066; H04L 65/1013; H04N 21/25833; H04N 21/2662; H04N 21/4436;
(Continued)

(56) References Cited

U.S. PATENT DOCUMENTS 9,344,676 B2 5/2016 Choi
9,699,518 B2 * 7/2017 Ohbitsu ............ H04N 21/6338
(Continued)

FOREIGN PATENT DOCUMENTS

EP 3 038 370 A1 6/2016
KR 10-2016-0086144 A 7/2016
(Continued)

OTHER PUBLICATIONS

European Search Report dated Oct. 25, 2021, issued in European Application No. 21173177.3.
(Continued)

*Primary Examiner* — Mounir Moutaouakil
(74) *Attorney, Agent, or Firm* — Jefferson IP Law, LLP

(57) ABSTRACT

An electronic device and a method of operating the same are provided. The electronic device includes a communication circuit configured to transmit or receive data using a call channel established through a call connection with an external electronic device, and a processor configured to transmit content, which is pre-processed using a first transmission filter, to the external electronic device through the call channel, receive a first real-time control protocol (RTCP) message transmitted by the external electronic device through the call channel, identify a status of the call channel, based on the first RTCP message, determine whether or not to perform an operation of pre-processing the content to be transmitted to the external electronic device using a second transmission filter, transmit a second RTCP message using the second transmission filter to the external electronic device, and perform transmission of the content, based on the second transmission filter.

21 Claims, 10 Drawing Sheets

(51) Int. Cl.
*H04N 21/24* (2011.01)
*H04N 21/6437* (2011.01)
*H04N 21/462* (2011.01)

(58) Field of Classification Search
CPC ....... H04N 21/47202; H04N 21/64792; H04N 21/2343; H04N 21/2402; H04N 21/4621; H04N 21/6437
See application file for complete search history.

(56) References Cited

U.S. PATENT DOCUMENTS

| | | | | |
|---|---|---|---|---|
| 9,826,260 | B2* | 11/2017 | Li | H04N 21/234381 |
| 10,375,391 | B2* | 8/2019 | Tao | H04N 19/61 |
| 10,387,000 | B2* | 8/2019 | Yu | H04N 21/43637 |
| 10,542,266 | B2* | 1/2020 | Samy | H04N 19/48 |
| 10,575,047 | B2* | 2/2020 | Yoshimura | H04N 21/42607 |
| 10,666,970 | B2* | 5/2020 | Kobayashi | H04N 19/56 |
| 11,153,601 | B2* | 10/2021 | Alshin | H04N 19/136 |
| 11,475,540 | B2* | 10/2022 | Na | G06T 3/4046 |
| 2004/0198280 | A1* | 10/2004 | Pan | H04B 1/123 455/182.3 |
| 2008/0253311 | A1 | 10/2008 | Jin | |
| 2009/0231415 | A1 | 9/2009 | Moore et al. | |
| 2011/0268185 | A1 | 11/2011 | Watanabe et al. | |
| 2015/0092575 | A1 | 4/2015 | Khay-Ibbat et al. | |
| 2019/0356364 | A1 | 11/2019 | Maamari et al. | |
| 2020/0012418 | A1 | 1/2020 | Choi et al. | |
| 2021/0105436 | A1 | 4/2021 | Lee et al. | |

FOREIGN PATENT DOCUMENTS

| | | |
|---|---|---|
| KR | 10-1951240 B1 | 2/2019 |
| KR | 10-2020-0044661 A | 4/2020 |
| KR | 10-2020-0044662 A | 4/2020 |
| WO | 2012/058394 A1 | 5/2012 |
| WO | 2013/056031 A1 | 4/2013 |
| WO | 2016/032873 A1 | 3/2016 |

OTHER PUBLICATIONS

International Search Report dated Jul. 27, 2021, issued in International Application No. PCT/KR2021/005235.
Jiang, F., Tao, W., Liu, S., Ren, J., Guo, X., & Zhao, D. (2017). An End-to-End Compression Framework Based on Convolutional Neural Networks. IEEE Transactions on Circuits and Systems for Video Technology, 1-1. doi:10.1109/tcsvt.2017.2734838, May 11, 2017.

* cited by examiner

ELECTRONIC DEVICE AND METHOD FOR TRANSMITTING AND RECEIVING CONTENT

CROSS-REFERENCE TO RELATED APPLICATION(S)

This application is based on and claims priority under 35 U.S.C. § 119(a) of a Korean patent application number 10-2020-0081503, filed on Jul. 2, 2020, in the Korean Intellectual Property Office, the disclosure of which is incorporated by reference herein in its entirety.

BACKGROUND

1. Field

The disclosure relates to an electronic device and a method of operating an electronic device. More particularly, the disclosure relates to a technology for transmitting or receiving content using a filter selected based on a status of a call channel.

2. Description of Related Art

Various electronic devices, such as smart phones, tablet personal computers (PCs), portable multimedia players (PMPs), personal digital assistants (PDAs), laptop PCs, wearable devices, and the like are proliferating.

Recent electronic devices are able to provide a voice call or a video call based on an Internet protocol (IP) multimedia subsystem (IMS) or a rich communication suite (RCS). In order to provide high-quality voices or videos while reducing the size of transmitted or received voice data or video data, the voice data or video data may be processed. Processing of voice data or video data may be primarily implemented in two steps. Operations of processing raw voice data produced using a microphone or raw video data produced using a camera may include an operation of reducing the size of the data while minimizing deterioration of quality using a filter and an operation of reducing the size of the data while compressing the voice data or video data.

Electronic devices may transmit and receive data through a call channel after call connection. The electronic device transmitting content may adjust the quality of the content depending on the status of the call channel. The electronic device transmitting content may transmit content of low quality when the status of the call channel is relatively poor, thereby increasing a content transmission success rate.

The above information is presented as background information only to assist with an understanding of the disclosure. No determination has been made, and no assertion is made, as to whether any of the above might be applicable as prior art with regard to the disclosure.

SUMMARY

In order to improve the quality of transmitted/received voice data or video data, an operation of pre-processing the voice data or video data using a transmission filter may be performed before the voice data or video data is encoded. Recently, in line with the development of technologies related to artificial intelligence, machine learning, or deep learning, and the advent of neural processing units, research on improvement of the quality of voice data or video data using transmission filters is underway.

The electronic device receiving the pre-processed voice data or video data may post-process the pre-processed voice data or video data using a reception filter corresponding to the transmission filter used in pre-processing. The post-processed voice data or video data may have higher quality than the received voice data or video data.

However, a transmission filter and/or reception filter implemented by technology related to artificial intelligence may have higher power consumption than a transmission filter and/or reception filter according to the related art. The operation of pre-processing content using a transmission filter and the operation of post-processing content using a reception filter, which are implemented by technology related to artificial intelligence, may have higher battery consumption than the operation of pre-processing content using the transmission filter and the operation of post-processing content using the reception filter due to the operation of neural processing units according to the related art.

Aspects of the disclosure are to address at least the above-mentioned problems and/or disadvantages and to provide at least the advantages described below. Accordingly, an aspect of the disclosure is to provide an apparatus and a method for transmitting or receiving content using a filter selected based on a status of a call channel.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit configured to transmit or receive data using a call channel established through a call connection with an external electronic device, and a processor, wherein the processor is configured to transmit content, which is pre-processed using a first transmission filter, to the external electronic device through the call channel, receive a first real-time transport control protocol (RTCP) message transmitted by the external electronic device through the call channel, identify a status of the call channel, based on the first RTCP message, determine whether or not to perform an operation of pre-processing the content to be transmitted to the external electronic device using a second transmission filter, based on the status of the call channel and performance information of the external electronic device, transmit a second RTCP message indicating whether or not to perform the operation of pre-processing the content using the second transmission filter to the external electronic device, and perform transmission of the content, based on the second transmission filter.

In accordance with another aspect of the disclosure, a method of operating an electronic device is provided. The method includes transmitting content, which is pre-processed using a first transmission filter, to an external electronic device through a call channel established between the external electronic device and the electronic device, receiving a first real-time transport control protocol (RTCP) message from the external electronic device through the call channel, identifying a status of the call channel, based on the first RTCP message, determining whether or not to perform an operation of pre-processing the content to be transmitted to the external electronic device using a second transmission filter, based on the status of the call channel and performance information of the external electronic device, transmitting a second RTCP message indicating whether or not to use the second transmission filter to the external electronic device, and performing transmission of the content, based on the second transmission filter.

An electronic device and a method of operating an electronic device according to various embodiments may identify the status of a call channel, based on a first RTCP message transmitted from a second electronic device that receives content, and may determine whether or not to perform an operation of pre-processing the content using a second transmission filter, based on the status of the call channel. Accordingly, the electronic device and the method of operating the electronic device according to various embodiments are able to provide high-quality content to a user at a receiving side using a transmission filter capable of providing high-quality content in a situation in which the status of the call channel is relatively poor.

An electronic device and a method of operating an electronic device according to various embodiments may identify the status of a call channel, based on a first RTCP message transmitted from a second electronic device that receives content, and may determine whether or not to perform an operation of pre-processing the content using a second transmission filter, based on the status of the call channel. Accordingly, the electronic device and the method of operating the electronic device according to various embodiments are able to reduce power consumption of a battery using a transmission filter having low power consumption in a situation in which the status of the call channel is relatively good, thereby preventing a sudden increase in the temperature of the device at a transmitting side.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
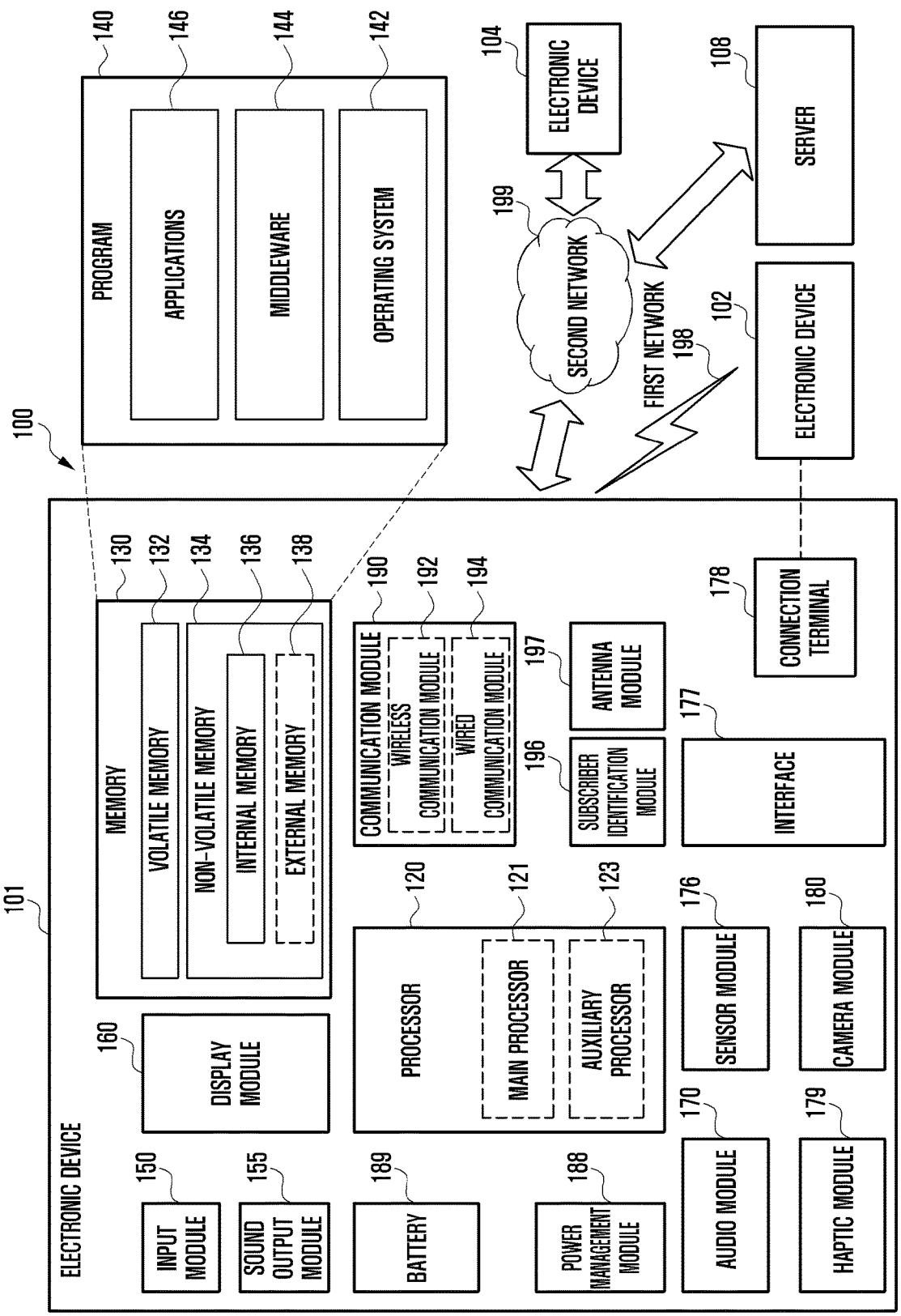
FIG. 1 is a block diagram of an electronic device according to an embodiment of the disclosure.

FIG. 1 is a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on $5^{th}$ generation (5G) communication technology or IoT-related technology.

Figure 2:
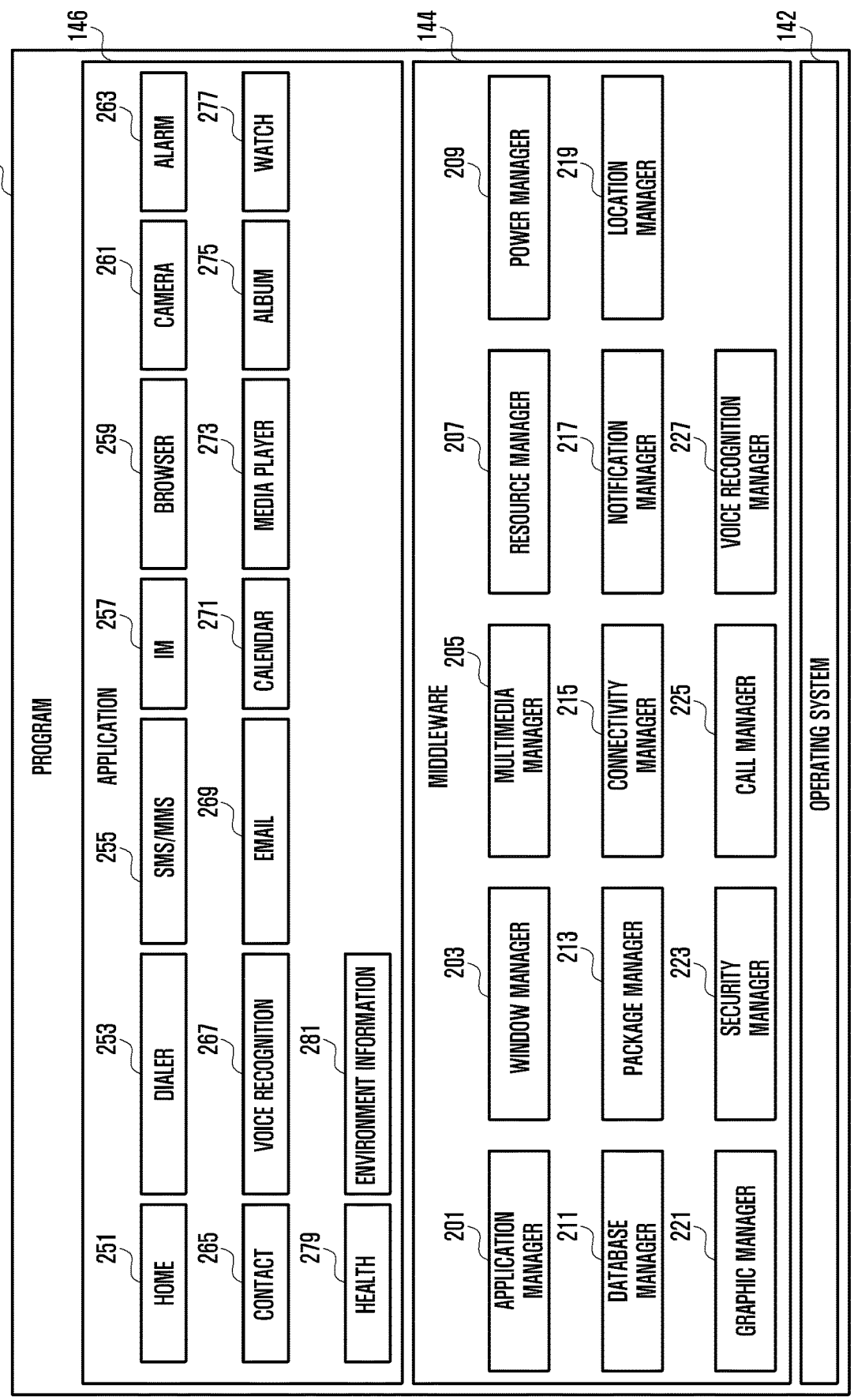
FIG. 2 is a block diagram of a program according to an embodiment of the disclosure.

FIG. 2 is a block diagram 200 of a program according to an embodiment of the disclosure.

Referring to FIG. 2, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment of the disclosure, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment of the disclosure, the middleware 244 may dynamically delete some existing components or add new components. According to an embodiment of the disclosure, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment of the disclosure, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3A:
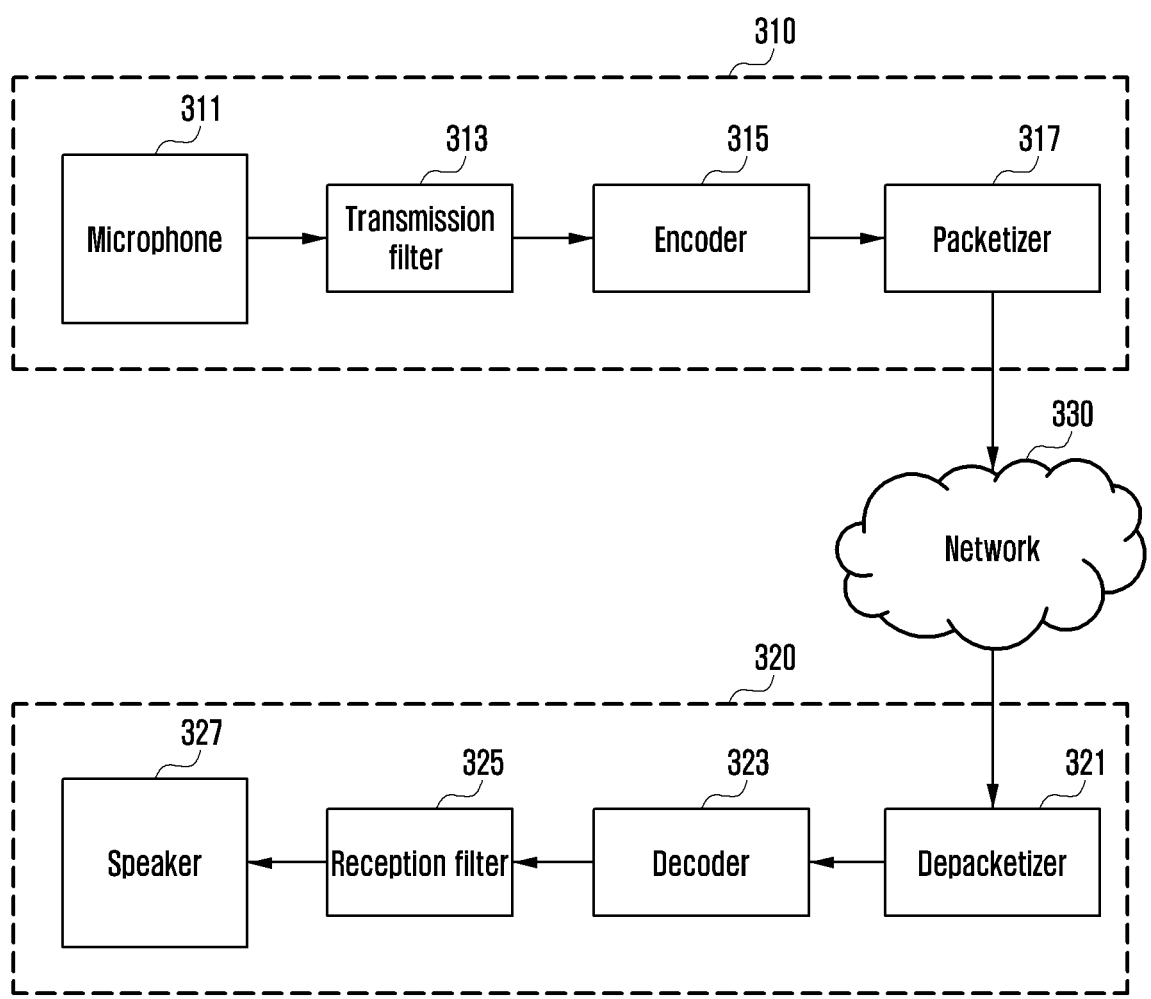
FIGS. 3A and 3B are block diagrams illustrating an embodiment in which a first electronic device and a second electronic device transmit or receive voice or video content according to various embodiments of the disclosure.
Figure 3B:
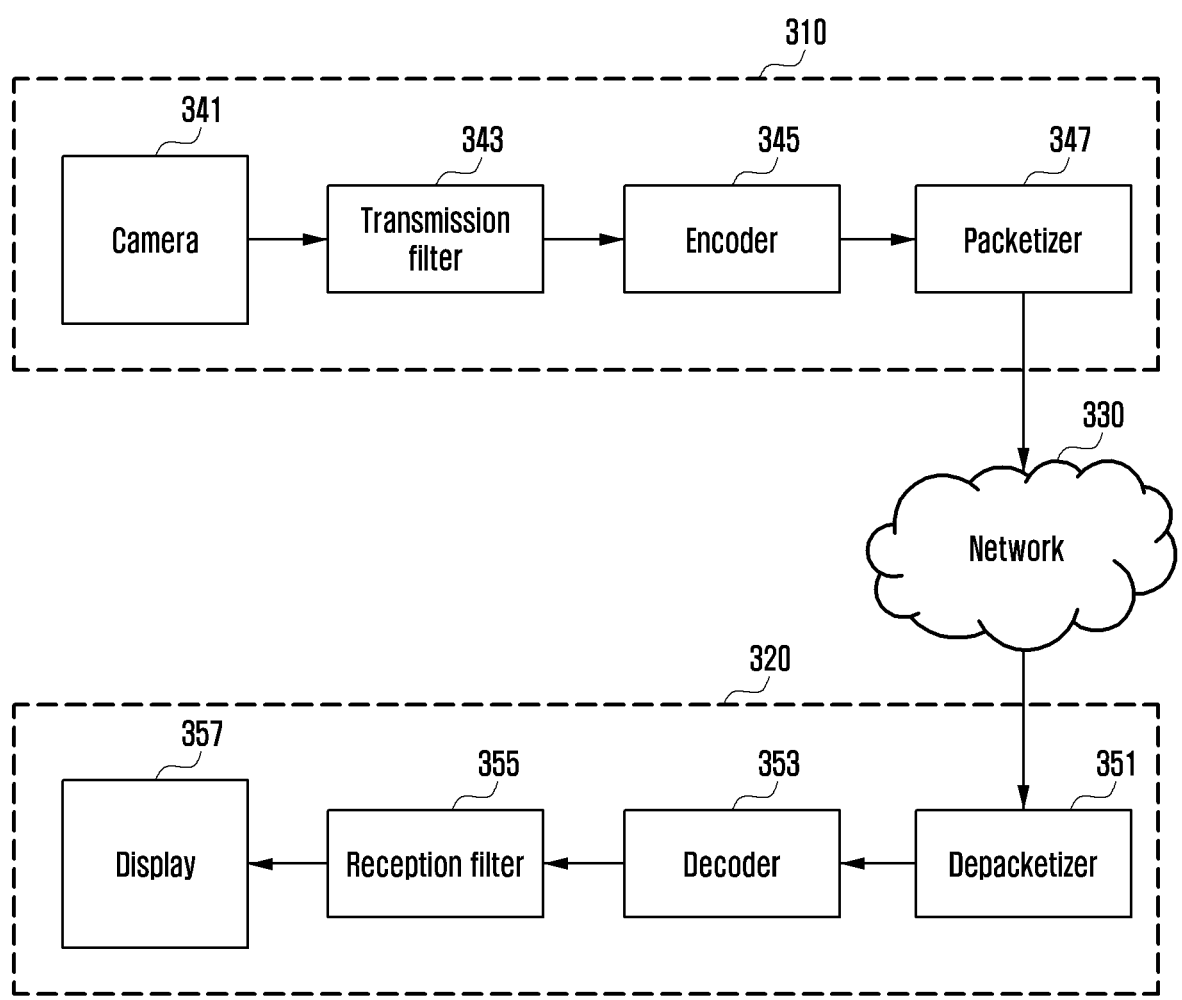

FIGS. 3A and 3B are block diagrams illustrating an embodiment in which a first electronic device and a second electronic device transmit or receive voice or video content according to various embodiments of the disclosure.

Referring to FIGS. 3A and 3B, a first electronic device 310 (e.g., the electronic device 101 in FIG. 1) and a second electronic device 320 (e.g., the electronic device 101 in FIG. 1) may perform voice calls or video calls based on various methods (e.g., an internet protocol (IP) multimedia subsystem (IMS) or a rich communication suite (RCS)). For convenience of explanation, the first electronic device 310 will be defined as a "transmission terminal", and the second electronic device 320 will be defined as a "reception terminal". In order to determine a bit-rate, a compression format (codec), or quality of voice data or video data (for example, this may indicate various variables representing the quality of voice data or video data, including a sampling rate for the voice data and resolution for the video data) transmitted and received during a call connection, the first electronic device 310 and the second electronic device 320 may perform mutual negotiation using a method defined in a session description protocol (SDP). The first electronic device 310 and the second electronic device 320 may determine characteristics of voice data or video data to be transmitted through mutual negotiation, and may transmit or receive voice data or video data using the determined characteristics. An embodiment of the mutual negotiation process for a call connection between the first electronic device 310 and the second electronic device 320 will be described later with reference to FIG. 4A.

Referring to FIG. 3A, it is a diagram illustrating an embodiment of processing voice data between the first electronic device 310 and the second electronic device 320.

According to various embodiments of the disclosure, the first electronic device 310 may include a microphone 311 (e.g., the input device 150 in FIG. 1) for receiving a voice from the user of the first electronic device 310, a transmission filter 313, an encoder 315 for encoding voice data transmitted by the transmission filter 313 in order to compress the voice data, and a packetizer 317 for converting the encoded voice data into voice packet data in the form of a packet.

According to various embodiments of the disclosure, the transmission filter 313 may be an element that performs a filtering operation on the voice data of a user transmitted from the microphone 311. The transmission filter 313 may perform a pre-processing operation (e.g., a filtering operation) before the voice data produced by the microphone 311 is input to the encoder 315, thereby producing voice data having a lower sampling rate than the sampling rate of the voice data produced by the microphone 311 (e.g., downscale). The transmission filter 313 may produce voice data having a low sampling rate, and may transmit the produced voice data to the encoder 315, thereby reducing the size of voice data to be transmitted to the second electronic device 320.

According to various embodiments of the disclosure, the transmission filter 313 may be implemented using various algorithms, and may produce voice content having a relatively low sampling rate while completely maintaining the quality of the voice content produced by the microphone 311.

According to various embodiments of the disclosure, the second electronic device 320 may include a depacketizer 321 for converting the voice data packet received through a network 330 into encoded voice data, a decoder 323 for decoding the encoded voice data converted by the depacketizer 321, a reception filter 325 for changing the sampling rate of the decoded voice data, and a speaker 327 (e.g., the sound output device 155 in FIG. 1) for outputting the voice data produced by the reception filter.

According to various embodiments of the disclosure, the reception filter 325 may be an element that performs a filtering operation on the decoded voice data produced by the decoder 323. The reception filter 325 may perform a post-processing operation (e.g., a filtering operation) on the decoded voice data, thereby producing voice data having a higher sampling rate than the sampling rate corresponding to the decoded voice data (e.g., upscale). The reception filter 325 may produce voice content having a higher sampling rate than the sampling rate corresponding to the decoded voice data, and may transmit the produced voice content to the speaker 327.

According to various embodiments of the disclosure, the reception filter 325 may be implemented using various algorithms, and may produce voice content having quality as similar as possible to the voice content produced by the microphone 311.

According to various embodiments of the disclosure, the transmission filter 313 and the reception filter 325 are filters that have learned how to fully maintain the quality of an original voice or video, and may be used by a processor of the electronic device 101 (e.g., the main processor 121 in FIG. 1 or the auxiliary processor 123 in FIG. 1 (e.g., a graphic processing unit (GPU) or a neural processing unit (NPU))) for processing the voice data or video data.

Referring to FIG. 3B, it is a diagram illustrating an embodiment of processing video data between the first electronic device 310 and the second electronic device 320.

According to various embodiments of the disclosure, the first electronic device 310 may include a camera 341 (e.g., the camera module 180 in FIG. 1) for producing video data including at least one still image, a transmission filter 343, an encoder 345 for encoding video data transmitted from the transmission filter 343 in order to compress the video data, and a packetizer 347 for converting the encoded video data into video packet data in the form of a packet.

According to various embodiments of the disclosure, the transmission filter 343 may be an element that performs a filtering operation on the video data. The transmission filter 343 may perform a pre-processing operation (e.g., a filtering operation) before the video data produced by the camera 341 is input to the encoder 345, thereby producing video data having lower resolution than that of the video data produced by the camera 341 (e.g., downscale). The transmission filter 343 may produce video data having relatively low resolution, and may transmit the produced video data to the encoder 345, thereby reducing the size of video data to be transmitted to the second electronic device 320.

According to various embodiments of the disclosure, the transmission filter 343 may be implemented using various algorithms, and may produce video data having relatively low resolution while completely maintaining the quality of the video data produced by the camera 341.

According to various embodiments of the disclosure, the second electronic device 320 may include a depacketizer 351 for converting a video data packet received through the network 330 into encoded video data, a decoder 353 for decoding the encoded video data converted by the depacketizer 351, a reception filter 355 for changing the resolution of the decoded video data, and a display 357 (e.g., the display device 160 in FIG. 1) for outputting the video data produced by the reception filter 355.

According to various embodiments of the disclosure, the reception filter 355 may be an element that performs a filtering operation on the decoded video data produced by the decoder 353. The reception filter 355 may perform a post-processing operation (e.g., a filtering operation) on the decoded video data, thereby producing video data having higher resolution than the resolution of the decoded video data (e.g., upscale). The reception filter 355 may transmit video data having relatively high resolution to the display 357.

According to various embodiments of the disclosure, the reception filter 355 may be implemented using various algorithms, and may produce video data having quality as similar as possible to the video data produced by the camera 341.

According to various embodiments of the disclosure, the transmission filter 343 and the reception filter 355 are filters that have learned how to fully maintain the quality of an original voice or video, and may be used by a processor of the electronic device 101 (e.g., the main processor 121 or the auxiliary processor 123 in FIG. 1) for processing the voice data or video data.

According to various embodiments of the disclosure, the transmission filters 313 and 343 and the reception filters 325 and 355 may be filters implemented using the same algorithm, and may be configured as a pair of filters for filtering the voice data or video data. The operation of the transmission filters 313 and 343 and the reception filters 325 and 355 as a pair may indicate the operation of filtering the voice data or video data using filters implemented using the same algorithm. The second electronic device 320 is able to obtain content of quality similar to the content (e.g., voice data or video data) produced by the first electronic device 310 only if the first electronic device 310 and the second electronic device 320 use transmission filters 313 and 343 and reception filters 325 and 355, which are implemented using the same algorithm.

According to various embodiments of the disclosure, various elements included in the first electronic device 310 and the second electronic device 320 (e.g., the transmission filters 313 and 343, the encoders 315 and 345, the packetizers 317 and 347, the depacketizers 321 and 351, the decoders 323 and 353, and the reception filter 325 and 355) may be implemented by software or hardware (e.g., implemented as a circuit or a chip).

Figure 4A:
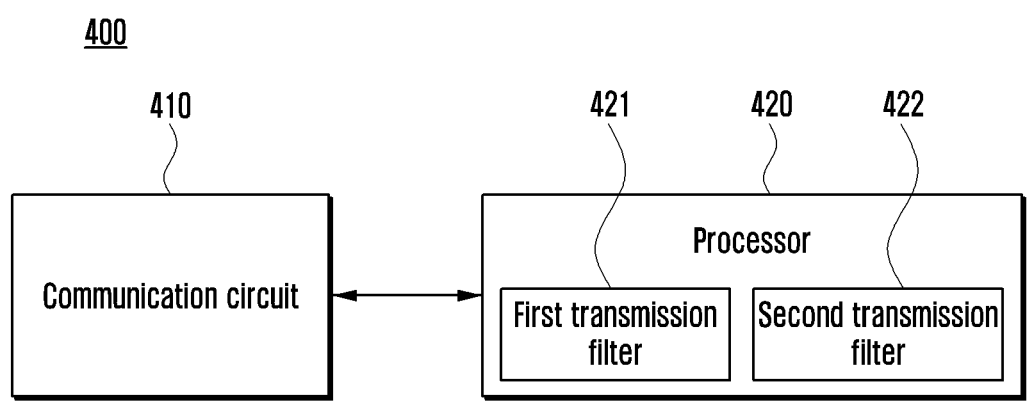
FIGS. 4A and 4B are block diagrams of a first electronic device according to various embodiments of the disclosure.

FIG. 4A is a block diagram of an electronic device according to an embodiment of the disclosure.

Referring to FIG. 4A, assuming that an electronic device 400 corresponds to a transmitting terminal (e.g., the first electronic device 310 in FIG. 3A) and an external electronic device corresponds to a second electronic device (e.g., the second electronic device 320 in FIG. 3A), an embodiment of activating the transmission filter 313, based on status information of a call channel between the first electronic device 310 and the second electronic device 320, will be described.

According to various embodiments of the disclosure, a first electronic device 400 (e.g., the electronic device 101 in FIG. 1 or the first electronic device 310 in FIGS. 3A and 3B) may include a communication circuit 410 (e.g., the wireless communication module 192 in FIG. 1) and a processor 420 (e.g., the processor 120 in FIG. 1). The processor 420 may be one of either the main processor 121 or the auxiliary processor 123 in FIG. 1. If the processor 420 is the auxiliary processor 123, the processor 420 may be a graphic processing unit (GPU) or a neural processing unit (NPU).

According to various embodiments of the disclosure, the communication circuit 410 may transmit voice data or video data using a communication channel (e.g., a cellular communication channel) established through a call connection with an external electronic device (e.g., the second electronic device 320 in FIGS. 3A and 3B). In addition thereto, the communication circuit 410 may receive voice data or video data from the second electronic device 320, and may transmit or receive a control message (e.g., an SDP type message) to or from the second electronic device 320.

According to various embodiments of the disclosure, the processor 420 may perform negotiation for a call connection with the second electronic device 320 using a method defined in a session description protocol.

According to various embodiments of the disclosure, the processor 420 may control the communication module 410 to transmit, to the second electronic device 320, a call connection request message for establishing a call channel between the second electronic device 320 and the first electronic device 310. For example, the call connection request message may be implemented in the form of an SDP invite message defined in a session description protocol (SDP).

According to various embodiments of the disclosure, the call connection request message may include quality information of voice data or video data transmitted by the first electronic device 400. For example, the quality information of voice data may include a sampling rate of voice data capable of being produced using a microphone (e.g., the microphone 311 in FIG. 3A), a sampling rate of voice data capable of being transmitted through a network (e.g., the network 330 in FIG. 3A), or a sampling rate of voice data capable of being received by the second electronic device 320. The quality information of video data may include the resolution of video data capable of being produced using a camera (e.g., the camera 341 in FIG. 3B), the resolution of video data capable of being transmitted through the network 330, or the resolution of video data capable of being received by the external electronic device.

For example, the call connection request message may be implemented in the form shown in Table 1 below.

TABLE 1

```
[-->] INVITE
m=audio 7010 RTP/AVP 110 100 98
b=AS:42
a=rtpmap:110 EVS/16000
a=mediaproc:110 upmodel=voice_up_coeff_1.1; downmodel=voice_down_coeff_1.1
a=audioattr:110 source [32000] send [16000] recv [16000] target [32000]
a=npu:ver2.0
a=rtpmap:100 AMR-WB/16000/1
a=mediaproc:100 upmodel=voice_up_coeff_1.1; downmodel=voice_down_coeff_1.1
a=audioattr:100 source [32000] send [16000] recv [16000] target [32000]
a=npu:ver2.0
a=rtpmap:98 AMR/8000/1
......
```

TABLE 1-continued

```
m=video 7020 RTP/AVP 112 102 34
b=AS:1280
a=rtpmap:112 H265/90000
a=mediaproc:112            upmodel=video_up_coeff_1.02;
downmodel=video_down_coeff_1.02
a=npu:ver2.0
a=imageattr:112 source [x=1440, y=2560] send [x=720, y=1280]
    recv [x=720, y=1280] target [x=1440, y=2560]
a=rtpmap:102 H264/90000
a=mediaproc:102            upmodel=video_up_coeff_1.02;
downmodel=video_down_coeff_1.02
a=npu:ver2.0
a=imageattr:102 source [x=960, y=1280] send [x=480, y=640]
    recv [x=480, y=640] target [x=960, y=1280]
a=rtpmap:34 H263/90000
a=imageattr:34 send [x=176,y=144] recv [x=176,y=144]
```

Referring to Table 1, the call connection request message may include an indicator indicating whether or not the first electronic device 310 supports the operation of pre-processing voice data using a specific algorithm (a=mediaproc), information on whether or not to support a processing operation using a neural processing unit (NPU) and NPU information (a=npu:ver2.0), identification information of the transmission filter 313 or 343 (upmodel=voice_up_coeff_1.1 and upmodel=video_up_coeff_1.02), identification information of the reception filter 325 or 355 (downmodel=voice_down_coeff_1.1 and downmodel=video_down_coeff_1.02), and quality information of voice data or video data. The quality information of voice data or video data may be included in a message body field (e.g., field "m" of the message body field) of an SDP invite message.

According to various embodiments of the disclosure, the second electronic device 320 may identify the quality information of voice data or video data included in the call connection request message, and may select a data transmission method capable of being supported by the second electronic device 320 from among the data transmission methods that the first electronic device 400 is able to support (e.g., a sampling method and a sampling rate of voice data, or a compression format and resolution of video data). The second electronic device 320 may transmit a response message including information on the selected data transmission method to the first electronic device 400. The response message may be implemented in the form of an SDP 200 OK message defined in the SDP protocol. For example, the response message may be implemented in the form described in Table 2 below.

TABLE 2

```
[<--] SIP/2.0 200 OK
m=audio 12350 RTP/AVP 100
b=AS:41
a=rtpmap:100 AMR-WB/16000/1
a=mediaproc:100 upmodel=voice_up_coeff_1.0; downmodel=voice_down_coeff_1.0
a=audioattr:100 source [32000] send [16000] recv [16000] target [32000]
a=npu:ver1.0
m=video 15490 RTP/AVP 102
b=AS:640
a=rtpmap:102 H264/90000
a=mediaproc:102 upmodel=nobias1.01; downmodel=basedown1.01
a=npu:ver1.0
a=imageattr:102 source [x=960, y=1280] send [x=480, y=640]
    recv [x=480, y=640] target [x=960, y=1280]
```

Referring to Table 2, the response message may include an indicator indicating whether or not the second electronic device 320 supports the operation of post-processing voice data or video data using a specific algorithm (a=mediaproc), information on whether or not to support a processing operation using a neural processing unit (NPU) and NPU information (a=npu:ver1.0), identification information of the transmission filter 313 or 343 (upmodel= voice_up_coeff_1.0 and upmodel=nobias1.01), identification information of the reception filter 325 or 355 (downmodel= voice_down_coeff_1.0 and downmodel=basedown1.01), and quality information of voice data or video data.

According to various embodiments of the disclosure, the processor 420 may transmit a call connection confirmation message to the second electronic device 320 in response to reception of the response message.

According to various embodiments of the disclosure, the call connection confirmation message may be a message instructing to perform a call connection using a transmission method of the voice data or video data included in the response message. For example, the call connection confirmation message may be an ACK signal with respect to the response message transmitted from the second electronic device 320.

According to various embodiments of the disclosure, the first electronic device 400 may perform at least one of various operations for a call connection (for example, an operation of activating the microphone 311 in order to produce voice data, an operation of activating the camera 341 in order to produce video data, or an operation of controlling the communication circuit 410 for transmitting or receiving data for establishing a call channel) with the second electronic device 320 that received the call connection confirmation message.

According to various embodiments of the disclosure, the processor 420 may control the communication circuit 410 to transmit or receive various data through a call channel established between the first electronic device 400 and the second electronic device 320. According to an embodiment of the disclosure, the processor 420 may perform a video call between the first electronic device 400 and the second electronic device 320 by transmitting or receiving content through the call channel.

According to various embodiments of the disclosure, the processor 420 may perform an operation of pre-processing content (e.g., voice data or video data) as part of an operation of transmitting at least a portion of the content to the second electronic device 320. The processor 420 may perform the operation of pre-processing content using a transmission filter (e.g., the transmission filter 313 in FIG. 3A or the transmission filter 343 in FIG. 3B), thereby converting the content so as to have the quality specified through call connection negotiation.

Figure 4B:
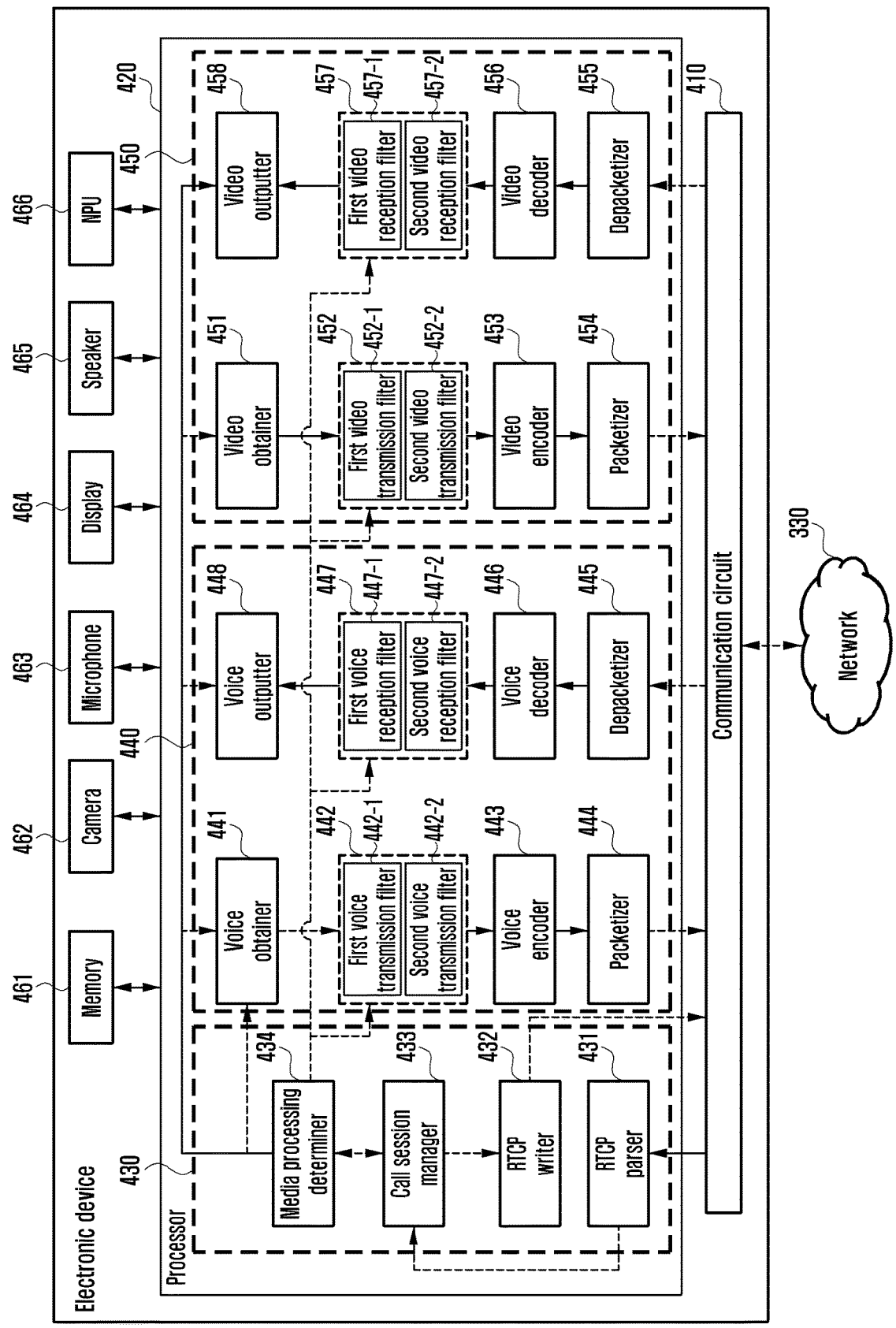

Referring to FIG. 4B, the first electronic device 400 may include at least two or more transmission filters including a first transmission filter 421 (e.g., a first video transmission filter 452-1 in FIG. 4B and a first voice transmission filter 442-1 in FIG. 4B) and a second transmission filter 422 (e.g., a second video transmission filter 452-2 in FIG. 4B and a second voice transmission filter 442-2 in FIG. 4B). In the pre-processing operation of content, the second transmission filter 422 may be a filter capable of realizing a video having higher quality than the content pre-processed using the first transmission filter 421. For example, the second transmission filter 422 may process the voice data or video data output from the second electronic device 320 so as to have a higher sampling rate than the first transmission filter 421. The content pre-processed using the second transmission filter 422 may have substantially the same quality as original content. The second transmission filter 422 may be a filter used in order for the processor 420 of the first electronic device 400 to process voice data or video data.

However, the pre-processing operation of content using the second transmission filter 422 may bring about an increase the amount of battery consumption due to the operation of a graphic processing unit or a neural processing unit of the electronic device 101, compared to the pre-processing operation of content using the first transmission filter 422.

The first electronic device 400 according to various embodiments may select any one of the first transmission filter 421 or the second transmission filter 422, based on the status of a call channel between the first electronic device 400 and the second electronic device 320, performance information of the first electronic device 400, and/or performance information of the second electronic device 320, and may perform the operation of pre-processing content using the selected filter. According to an embodiment of the disclosure, if the status of the call channel between the first electronic device 400 and the second electronic device 320 is good (or if a packet loss rate thereof is low), the first electronic device 400 perform pre-processing of content using the first video transmission filter 452-1, thereby realizing relatively low power consumption. According to an embodiment of the disclosure, if the status of the call channel between the first electronic device 400 and the second electronic device 320 is poor (or if a packet loss rate thereof is high), the first electronic device 400 may perform pre-processing of content using the second video transmission filter 452-2, thereby transmitting content of relatively high quality.

Hereinafter, an operation of pre-processing a video using one video transmission filter of the first transmission filter 421 or the second transmission filter 422, based on status information of the network between the first electronic device 400 and the second electronic device 320, will be described.

According to various embodiments of the disclosure, in order to implement real-time data transmission or reception, the processor 420 may transmit at least a portion of content to the second electronic device 320 through a real-time transport protocol (RTP) packet. The processor 420 may receive the RTP packet including content (e.g., video data) transmitted from the second electronic device 320.

According to various embodiments of the disclosure, the processor 420 may receive a first real-time transport control protocol (RTCP) message including control information for controlling transmission or reception of content from the second electronic device 320 through the communication circuit 410.

According to various embodiments of the disclosure, the first RTCP message may include information for identifying the status of a call channel between the first electronic device 400 and the second electronic device 320.

According to an embodiment of the disclosure, the first RTCP message may include one-way-delay (OWD) information indicating the time during which the packet (e.g., an RTP packet) transmitted by the first electronic device 400 or the second electronic device 320 stays in the call channel. The OWD information may include the difference between the time at which the first electronic device 400 transmits a specified packet and the time at which the second electronic device 320 receives the specified packet, or the difference between the time at which the second electronic device 320 transmits a specified packet and the time at which the first electronic device 400 receives the specified packet. An increase in the OWD information may indicate that the time for which the packet stays in the call channel increases, and an increase in the time for which the packet stays in the call channel may indicate that the status of the call channel is deteriorated. The OWD information may be included in the payload of a first RTCP message in a receiver report (RR) type or a sender report (SR) type.

According to an embodiment of the disclosure, the first RTCP message may include perceived bit-rate information, which is the ratio of the size of a packet transmitted from the first electronic device 400 (e.g., an RTP packet) to the size of the packet received by the second electronic device 320. If the size of the packet received by the second electronic device 320 is less than the size of the packet transmitted by the first electronic device 400, this may indicate that the status of the call channel is deteriorated. The perceived bit-rate information may be included in the payload of a first RTCP message in an application-specific (APP) type.

According to an embodiment of the disclosure, the first RTCP message may include a packet loss rate indicating a loss rate of a packet (e.g., an RTP packet) transmitted by the first electronic device 400 when the second electronic device 320 receives the packet transmitted from the first electronic device 400. An increase in the packet loss rate may indicate that the status of the call channel is deteriorated. The packet loss rate may be included in the payload of a first RTCP message in a receiver report (RR) type.

According to various embodiments of the disclosure, the processor 420 may identify (or predict) the status of the call channel between the first electronic device 400 and the second electronic device 320, based on information indicating the status of the call channel, which is included in the first RTCP message.

According to various embodiments of the disclosure, the processor 420 may receive the first RTCP message every specified period while transmitting content to the second electronic device 320. The processor 420 may identify the status of the call channel between the first electronic device 400 and the second electronic device 320 every specified period, based on the first RTCP message. The processor 420 may identify whether or not the status of the call channel satisfies a specified condition. The specified condition may be a condition indicating that the status of the call channel is deteriorated. In response to identifying that the status of the call channel satisfies the specified condition, the processor 420 may reduce the size of content to be transmitted to the second electronic device 320 in order to increase the transmission rate of the content to be transmitted to the second electronic device 320.

According to various embodiments of the disclosure, the processor 420 may reduce the resolution and/or frame rate of the video content in order to reduce the size of the content to be transmitted to the second electronic device 320. The processor 420 may reduce the sound quality of the voice content in order to reduce the size of the content to be transmitted to the second electronic device 320. In order to increase (or upscale) the quality of content having relatively low quality due to the status of the call channel, in the case where the second electronic device 320 supports a second reception filter (e.g., the second reception filter 522 in FIG. 5) corresponding to the second transmission filter 422, the first electronic device 400 may perform pre-processing of content using the second transmission filter 422.

According to various embodiments of the disclosure, the processor 420 may identify performance information of the second electronic device 320, which is related to whether or not the second electronic device 320 is able to process the content pre-processed using the second transmission filter 422.

According to various embodiments of the disclosure, the processor 420 may identify performance information of the second electronic device 320 before connection of a call channel between the first electronic device 400 and the second electronic device 320 or after connection of the call channel between the first electronic device 400 and the second electronic device 320.

According to various embodiments of the disclosure, the processor 420 may receive a call connection response message including performance information of the second electronic device 320 while establishing a call connection between the first electronic device 400 and the second electronic device 320, and may identify the performance information of the second electronic device 320 included in the call connection response message.

According to various embodiments of the disclosure, the processor 420 may receive an RTCP message including performance information of the second electronic device 320 after connection of a call channel between the first electronic device 400 and the second electronic device 320, and may identify the performance information of the second electronic device 320 included in the RTCP message. The RTCP message including the performance information of the second electronic device 320 may be the same message as the first RTCP message, or may be a different message from the first RTCP message.

According to various embodiments of the disclosure, the performance information of the second electronic device 320 may include information on the elements by which the electronic device 400 is able to process the content pre-processed using the second transmission filter 422 (e.g., elements implemented in software (the second video reception filter 457-2 in FIG. 4B or the second voice reception filter 447-2 in FIG. 4B) or elements implemented in hardware (e.g., a neural processing unit)).

According to various embodiments of the disclosure, the performance information of the second electronic device 320 may include information on the second reception filter (e.g., the second reception filter 522 in FIG. 5) corresponding to the second transmission filter 422. For example, the information on the second reception filter 522 may include model information of the second reception filter 522, version information thereof, and information on the maximum sampling rate of voice data or the maximum resolution of video data that the second reception filter 522 is able to process.

According to various embodiments of the disclosure, the performance information of the second electronic device 320 may include information on the battery level of the second electronic device 320. If the battery level of the second electronic device 320 is greater than or equal to a specified value, the second electronic device 320 may activate the second reception filter 447-2 or 457-2 corresponding to the second transmission filter 422.

According to various embodiments of the disclosure, the performance information of the second electronic device 320 may include information on the temperature of the second electronic device 320. The temperature of the second electronic device 320 may be a measured temperature of an element (e.g., an application processor) implemented in the second electronic device 320. If the temperature of the second electronic device 320 is less than or equal to a specified value, the second electronic device 320 may activate the second reception filters 447-2 or 457-2 corresponding to the second transmission filter 422.

According to various embodiments of the disclosure, the processor 420 may determine whether or not to perform an operation of pre-processing content using the second transmission filter 422, based on the status of the call channel and the performance information of the second electronic device 320.

According to various embodiments of the disclosure, in response to identifying that the second electronic device 320 does not support the second reception filter corresponding to the second transmission filter 422, the processor 420 may not perform the operation of pre-processing content using the second transmission filter 422. In this case, the processor 420 may perform the operation of pre-processing content using the first transmission filter 421.

According to various embodiments of the disclosure, in response to identifying that the second electronic device 320 supports the second reception filter corresponding to the second transmission filter 422 and that the status of the call channel satisfies a specified condition, the processor 420 may determine to perform the operation of pre-processing content using the second transmission filter 422. The specified condition may indicate that the status of the call channel is deteriorated.

According to an embodiment of the disclosure, in response to identifying that the OWD value is greater than or equal to (or above) a specified value, the processor 420 may determine to perform the operation of pre-processing content using the second transmission filter 422.

According to an embodiment of the disclosure, in response to identifying that the perceived bit-rate value is less than or equal to (or below) a specified value, the processor 420 may determine to perform the operation of pre-processing content using the second transmission filter 422.

According to an embodiment of the disclosure, in response to identifying that a packet loss rate value is greater than or equal to (or above) a specified value, the processor 420 may determine to perform the operation of pre-processing content using the second transmission filter 422.

According to various embodiments of the disclosure, in response to the determination to perform the operation of pre-processing content using the second transmission filter 422, the processor 420 may control the communication circuit 410 to transmit, to the second electronic device 320, a second RTCP message instructing to perform the operation of pre-processing content using the second transmission filter. In response to the determination to perform the operation of pre-processing content using the first transmission filter 421, the processor 420 may control the communication circuit 410 to transmit, to the second electronic device 320, a second RTCP message instructing to perform the operation of pre-processing content using the first transmission filter 421.

According to various embodiments of the disclosure, the processor 420 may activate the second transmission filter 422, and may perform the operation of pre-processing content using the second transmission filter 422. In response to the determination to perform the operation of pre-processing content using the second transmission filter 422 in the situation of performing the operation of pre-processing content using the first transmission filter 421, the processor 420 may deactivate the first transmission filter 421, and may activate the second transmission filter 422.

According to various embodiments of the disclosure, the processor 420 may maintain the activated state of the first transmission filter 421 while activating the second transmission filter 422. According to an embodiment of the disclosure, the processor 420 may apply an effect to the content through the first transmission filter 421, and may perform the operation of pre-processing the content to which the effect was applied through the second transmission filter 422. The processor 420 may apply various effects (e.g., in the case of video data, effects on at least a portion of the frame included in the video data (e.g., beauty face, black and white effect, inversion effect, and sepia effect)) to the content using the first transmission filter 421.

According to various embodiments of the disclosure, the processor 420 may further consider performance information of the first electronic device 400 in determining to perform the operation of pre-processing content using the second transmission filter 422.

According to various embodiments of the disclosure, the performance information of the first electronic device 400 may include information on the battery level of the first electronic device 400. If the battery level of the first electronic device 400 is greater than or equal to a specified value, the first electronic device 400 may determine to perform the operation of pre-processing content using the second transmission filter 422.

According to various embodiments of the disclosure, the performance information of the first electronic device 400 may include information on the temperature of the first electronic device 400. The temperature of the first electronic device 400 may be a measured temperature of an element (e.g., an application processor) implemented in the first electronic device 400. If the temperature of the first electronic device 400 is less than or equal to a specified value, the first electronic device 400 may determine to perform the operation of pre-processing content using the second transmission filter 422.

According to various embodiments of the disclosure, the processor 420 may select a transmission filter that is to perform pre-processing of content, based on the status of the call channel, the performance information of the second electronic device 320, and/or the performance information of the first electronic device 400. According to an embodiment of the disclosure, if the status of the call channel satisfies a predetermined condition (e.g., a condition indicating that the status of the call channel is relatively good), the processor 420 may select the first transmission filter 421 capable of performing the pre-processing operation and having low power consumption, and may perform the operation of pre-processing content using the first transmission filter 421. According to an embodiment of the disclosure, if the status of the call channel satisfies a predetermined condition (e.g., a condition indicating that the status of the call channel is relatively poor) (e.g., in the case where content of lower quality than the quality (e.g., resolution or sound quality) negotiated through the call channel connection is to be transmitted), the processor 420 may select the second transmission filter 422 capable of performing a pre-processing operation for transmitting content of relatively high quality, and may perform the operation of pre-processing content using the second transmission filter 422. Therefore, the first electronic device 400 according to various embodiments is able to transmit content of high quality even when the status of the call channel is relatively poor, and is able to reduce power consumption when the status of the call channel is relatively good.

Although the above embodiment has been described on the assumption that the first electronic device 400 includes both the first transmission filter 421 and the second transmission filter 422, the first electronic device 400 may include only the second transmission filter 422. In the case where the first electronic device 400 includes only the second transmission filter 422, the first electronic device 400 may be implemented without the pre-processing operation using the first transmission filter 421. The first electronic device 400 may transmit content that is not pre-processed to an encoder (e.g., the encoder 315 in FIG. 3A or the encoder 345 in FIG. 3A). The first electronic device 400 may determine whether or not to perform the operation of pre-processing content using the second transmission filter 422, based on the status of the call channel, the performance information of the first electronic device 400, and/or the performance information of the second electronic device 400. In response to determination to perform the operation of pre-processing content, the first electronic device 400 may activate the second transmission filter 422, and may perform the operation of pre-processing content using the second transmission filter 422.

FIG. 4B is a block diagram of an electronic device according to an embodiment of the disclosure.

Referring to FIG. 4B, an electronic device 400 according to various embodiments may include a call connection management unit 430 for performing or managing a call connection, a voice data processing unit 440 for performing a processing operation for transmitting voice data or an operation of processing received voice data, a video data processing unit 450 for performing a processing operation for transmitting video data or an operation of processing received video data, a memory 461 (e.g., the memory 130 in FIG. 1), a camera 462 (e.g., the camera module 180 in FIG. 1), a microphone 463 (e.g., the input device 150 in FIG. 1), a display 464 (e.g., the display device 160 in FIG. 1), a speaker 465 (e.g., the sound output device 155 in FIG. 1), and a neural processing unit (NPU) 466.

According to various embodiments of the disclosure, the call connection management unit 430 may include an RTCP parser 431 for parsing an RTCP message received from the second electronic device (e.g., the second electronic device 320 in FIGS. 3A and 3B) during performing call connection, an RTCP writer 432 for producing an RTCP message for controlling a call channel, a call session manager 433 for managing connection or termination of a call session and identifying the status of a call channel between the first electronic device 400 and the second electronic device 320, and a media processing determiner 434 for determining whether or not to perform data processing using a specific filter, based on the performance information of the external electronic device 320 received from the second electronic device 320, the status of the call channel, and/or the performance information of the first electronic device 400.

According to various embodiment of the disclosure s, in terms of transmitting voice data, the voice data processing unit 440 may include a voice obtainer 441 that acquires voice data using a microphone 463, a voice transmission filter 442 (e.g., the transmission filter 313 in FIG. 3A) that is an element for performing a filtering operation on voice data, a voice encoder 443 (e.g., the encoder 315 in FIG. 3A) for encoding voice data transmitted from the transmission filter 442 in order to compress the voice data, and a packetizer 444 (e.g., the packetizer 317 in FIG. 3A) for converting encoded voice data into voice packet data in the form of a packet.

According to various embodiments of the disclosure, the voice transmission filter 442 may include a plurality of voice transmission filters including a first voice transmission filter 442-1 and a second voice transmission filter 442-2. The second voice transmission filter 442-2 may be a filter capable of realizing a voice of higher quality than the voice data pre-processed using the first voice transmission filter 442-1 in the pre-processing operation of voice data. The second voice transmission filter 442-2 may be a filter used in order for a neural processing unit 466 to process voice data.

According to various embodiments of the disclosure, in terms of receiving voice data, the voice data processing unit 440 may include a depacketizer 445 (e.g., the depacketizer 321 in FIG. 3A) for converting voice packet data received from the external electronic device 320 into encoded voice data, a voice decoder 446 (e.g., the decoder 323 in FIG. 3A) for decoding the encoded voice data, a voice reception filter 447 (e.g., the reception filter 325 in FIG. 3A) for changing the sampling rate of the decoded voice data, and a voice outputter 448 for outputting a voice through the speaker 465.

According to various embodiments of the disclosure, the voice reception filter 447 may include a plurality of voice reception filters including a first voice reception filter 447-1 and a second voice reception filter 447-2. The first voice reception filter 447-1 may be a filter that processes the voice data pre-processed using the first voice transmission filter 442-1. The second voice reception filter 447-2 may be a filter that processes the voice data pre-processed using the second voice transmission filter 442-2. The second voice reception filter 447-2 may be a filter used in order for the neural processing unit 466 to process voice data.

According to various embodiments of the disclosure, in terms of transmitting video data, the video data processing unit 450 may include a video obtainer 451 that acquires a video captured by the camera 462, a video transmission filter 452 (e.g., the transmission filter 343 in FIG. 3B) that is an element for performing a filtering operation on video data, a video encoder 453 (e.g., the encoder 345 in FIG. 3B) for encoding video data in order to compress the video data, and a packetizer 454 (e.g., the packetizer 347 in FIG. 3B) for converting encoded video data into video packet data in the form of a packet.

According to various embodiments of the disclosure, the video transmission filter 452 may include a plurality of video transmission filters including a first video transmission filter 452-1 and a second video transmission filter 452-2. The second video transmission filter 452-2 may be a filter capable of realizing a video of higher quality than the video data pre-processed using the first video transmission filter 452-1 in the pre-processing operation of video data. The second video transmission filter 452-2 may be a filter used in order for the neural processing unit 466 to process video data.

According to various embodiments of the disclosure, in terms of receiving video data, the video data processing unit 450 may include a depacketizer 455 (e.g., the depacketizer 351 in FIG. 3B) for converting video data packet received from the external electronic device 320 into encoded video data, a video decoder 456 (e.g., the decoder 353 in FIG. 3B) for decoding the encoded video data converted by the depacketizer 455, a video reception filter 457 (e.g., the reception filter 355 in FIG. 3B) for changing the resolution of the decoded video data, and a video outputter 458 for outputting video data produced by the reception filter 457 through the display 464.

According to various embodiments of the disclosure, the video reception filter 457 may include a plurality of video reception filters including a first video reception filter 457-1 and a second video reception filter 457-2. The first video reception filter 457-1 may be a filter for processing the video data pre-processed using the first video transmission filter 452-1. The second video reception filter 457-2 may be a filter for processing the video data pre-processed using the second video transmission filter 452-2. The second video reception filter 457-2 may be a filter used in order for the neural processing unit 466 to process video data.

According to various embodiments of the disclosure, the RTCP writer 432 may produce an RTCP message, based on the control of the call session manager 433, and may transmit the RTCP message to the second electronic device 320 through the communication circuit 410. The RTCP message may include control information for controlling transmission or reception of content.

According to various embodiments of the disclosure, the RTCP message may include information on the voice transmission filter 442 and the video transmission filter 452, an indicator indicating whether or not to support pre-processing of voice data or video data using a specific algorithm (e.g., a pre-processing algorithm using an NPU), and performance information of the first electronic device 400 in relation to the voice transmission filter 442 and the video transmission filter 452.

According to various embodiments of the disclosure, the RTCP parser 431 may parse an RTCP message received through the communication circuit 410. The RTCP message may include information for identifying the status of a call channel between the first electronic device 400 and the second electronic device 320, and/or performance information of the second electronic device 320 in relation to whether or not the content pre-processed using the transmission filters 442 and 452 is able to be processed.

According to various embodiments of the disclosure, the performance information of the second electronic device 320, which is extracted by the RTCP parser 431 through parsing of the RTCP message, may be transmitted to the media processing determiner 434 through the call session manager 433.

According to various embodiments of the disclosure, the media processing determiner 434 may determine whether or not to perform an operation of pre-processing content using the second voice transmission filter 442-2 or the second video transmission filter 452-2, based on the status of the call channel and the performance information of the second electronic device 320.

According to various embodiments of the disclosure, in response to identifying that the second electronic device 320 does not support the second voice reception filter 447-2 corresponding to the second voice transmission filter 442-2 or does not support the second video reception filter 457-2 corresponding to the second video transmission filter 452-2, the processor 420 may not perform the operation of pre-processing content using the second voice transmission filter 442-2 or the second video transmission filter 452-2. In this case, the processor 420 may perform the operation of pre-processing content using the first voice transmission filter 442-1 or the first video transmission filter 452-1.

According to various embodiments of the disclosure, in response to identifying that the second electronic device 320 supports the second voice reception filter 447-2 corresponding to the second voice transmission filter 442-2 or supports the second video reception filter 457-2 corresponding to the second video transmission filter 452-2 and that the status of the call channel satisfies a specified condition, the processor 420 may determine to perform the operation of pre-processing content using the second voice transmission filter 442-2 or the second video transmission filter 452-2. The specified condition indicates that the status of the call channel is deteriorated.

According to various embodiments of the disclosure, in response to determination to perform the pre-processing operation of voice data or video data, the media processing determiner 434 may activate the second voice transmission filter 442-2, the second video transmission filter 452-2, and an element (e.g., the NPU 466) that performs the pre-processing operation of voice data or video data using the second voice transmission filter 442-2 and the second video transmission filter 452-2.

According to various embodiments of the disclosure, the call session manager 433 may transmit a second RTCP message indicating whether or not to use the second voice transmission filter 442-2 or the second video transmission filter 452-2 to the external electronic device 320 through the communication circuit 410.

According to various embodiments of the disclosure, the elements implemented in the processor 420 of the electronic device 400 may be elements implemented in software, but some elements may be implemented in hardware according to a design method.

Figure 5:
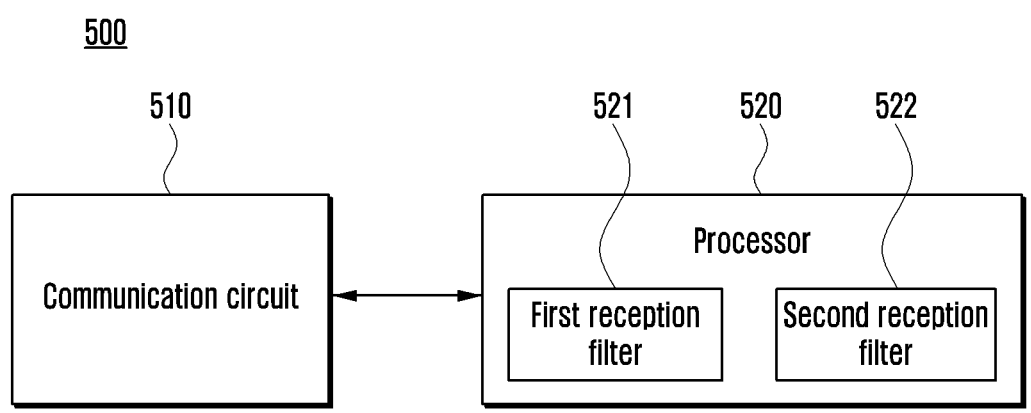
FIG. 5 is a block diagram of a second electronic device according to an embodiment of the disclosure.

FIG. 5 is a block diagram of an electronic device according to an embodiment of the disclosure.

Referring to FIG. 5, the second electronic device 500 (e.g., the electronic device 101 in FIG. 1 or the second electronic device 320 in FIGS. 3A and 3B) may include a communication circuit 510 (e.g., the wireless communication module 192 in FIG. 1) and a processor 520 (e.g., the processor 120 in FIG. 1).

According to various embodiments of the disclosure, the communication circuit 510 may receive voice data or video data using a communication channel (e.g., a cellular communication channel) established through a call connection with the first electronic device 400 (e.g., the first electronic device 400 in FIG. 4A). The communication circuit 510 may transmit voice data or video data to the first electronic device 400, and may transmit or receive a control message (e.g., an SDP type message) to or from the first electronic device 400.

According to various embodiments of the disclosure, the processor 520 may perform negotiation for a call connection with the first electronic device 400 using a method defined in a session description protocol.

According to various embodiments of the disclosure, the processor 520 may receive a call connection request message for establishing a call channel between the second electronic device 320 and the first electronic device 310. For example, the call connection request message may be implemented in the form of an SDP invite message defined in the SDP.

According to various embodiments of the disclosure, the call connection request message may include quality information of voice data or video data transmitted from the first electronic device 400. For example, the quality information of voice data may include a sampling rate of voice data capable of being produced using a microphone (e.g., the microphone 311 in FIG. 3A), a sampling rate of voice data capable of being transmitted through a network (e.g., the network 330 in FIG. 3A), or a sampling rate of voice data capable of being received by the second electronic device 500. The quality information of video data may include the resolution of video data capable of being produced using a camera (e.g., the camera 341 in FIG. 3B), the resolution of video data capable of being transmitted through the network 330, or the resolution of video data capable of being received by the external electronic device. The quality information of video data may be included in the call connection request message as shown in Table 1.

According to various embodiments of the disclosure, the processor 520 may identify the quality information of voice data or video data included in the call connection request message, and may select a data transmission method capable of being supported by the second electronic device 500 from among the data transmission methods that the first electronic device 400 is able to support (e.g., a sampling method and a sampling rate of voice data, or a compression format and resolution of video data). The processor 520 may control the communication circuit 510 to transmit a response message including information on the selected data transmission method to the first electronic device 400. For example, the response message may be implemented in the form of an SDP 200 OK message defined in the SDP protocol. Information on the selected data transmission method may be included in the response message as shown in Table 2.

According to various embodiments of the disclosure, the processor 520 may receive a call connection confirmation message corresponding to the response message from the first electronic device 400.

According to various embodiments of the disclosure, the call connection confirmation message may be a message instructing to perform a call connection using the transmission method of voice data or video data included in the response message.

According to various embodiments of the disclosure, the processor 520 may perform at least some of various operations for a call connection with the first electronic device 400 (for example, an operation of activating the microphone 311 in order to produce voice data, an operation of activating the camera 341 in order to produce video data, or an operation of controlling the communication circuit 510 to transmit or receive data for establishing a call channel).

According to various embodiments of the disclosure, the processor 520 may perform a post-processing operation on the pre-processed content (e.g., voice data or video data) transmitted from the first electronic device 400. The processor 420 may perform a post-processing operation on the content using a reception filter (e.g., the reception filter 325 in FIG. 3A or the reception filter 355 in FIG. 3B).

According to various embodiments of the disclosure, the second electronic device 500 may include at least two or more reception filters including a first reception filter 521 (e.g., the first video reception filter 457-1 in FIG. 4B or the first voice reception filter 447-1 in FIG. 4B) and a second reception filter 522 (e.g., the second video reception filter 457-2 in FIG. 4B or the second voice reception filter 447-2 in FIG. 4B). The second reception filter 522 may be a filter capable of realizing a video of higher quality than the content post-processed using the first reception filter 521 in post-processing of content. The second reception filter 522 may be a filter used in order for a neural processing unit (e.g., the NPU 466 in FIG. 4B) of the second electronic device 500 to process voice data or video data.

According to various embodiments of the disclosure, the processor 520 may transmit a first real-time transport control protocol (RTCP) message including control information for controlling transmission or reception of content to the first electronic device 400 through the communication circuit 510.

According to various embodiments of the disclosure, the first RTCP message may include information for identifying the status of a call channel between the first electronic device 400 and the second electronic device 320.

According to an embodiment of the disclosure, the first RTCP message may include one-way-delay (OWD) information indicating the time during which the packet (e.g., an RTP packet) transmitted by the first electronic device 400 or the second electronic device 320 stays in the call channel. The OWD information may include the difference between the time at which the first electronic device 400 transmits a specified packet and the time at which the second electronic device 320 receives the specified packet, or the difference between the time at which the second electronic device 320 transmits a specified packet and the time at which the first electronic device 400 receives the specified packet. An increase in the OWD information may indicate that the time for which the packet stays in the call channel increases, and an increase in the time for which the packet stays in the call channel may indicate that the status of the call channel is deteriorated.

According to an embodiment of the disclosure, the first RTCP message may include perceived bit-rate information, which indicates the ratio of the size of a packet transmitted from the first electronic device 400 (e.g., an RTP packet) to the size of the packet received by the second electronic device 320. If the size of the packet received by the second electronic device 320 is less than the size of the packet transmitted by the first electronic device 400, this may indicate that the status of the call channel is deteriorated.

According to an embodiment of the disclosure, the first RTCP message may include a packet loss rate indicating a loss rate of a packet (e.g., an RTP packet) transmitted by the first electronic device 400 when the second electronic device 320 receives the packet transmitted from the first electronic device 400. An increase in the packet loss rate may indicate that the status of the call channel is deteriorated.

According to various embodiments of the disclosure, the processor 520 may transmit, to the first electronic device 400, a first RTCP message including information indicating the status of a call channel between the first electronic device 400 and the second electronic device 500.

According to various embodiments of the disclosure, the processor 520 may transmit, to the first electronic device 400, performance information of the second electronic device 320 in relation to whether or not the second electronic device 320 is able to process the pre-processed content using the second reception filter 522.

According to various embodiments of the disclosure, the processor 520 may transmit a call connection response message including performance information of the second electronic device 320 while establishing a call connection between the first electronic device 400 and the second electronic device 320. The processor 520 may transmit an RTCP message including performance information of the second electronic device 320 after connection of a call channel between the first electronic device 400 and the second electronic device 320. The RTCP message including the performance information of the second electronic device 320 may be the same message as the first RTCP message, or may be a different message from the first RTCP message.

According to various embodiments of the disclosure, the performance information of the second electronic device 320 may include information on a second reception filter (e.g., the second reception filter 522 in FIG. 5) corresponding to the second transmission filter 422. For example, the information on the second reception filter 522 may include model information of the second reception filter 522, version information thereof, and information on the maximum sampling rate of voice data or the maximum resolution of video data, which is capable of being processed by the second reception filter 522.

According to various embodiments of the disclosure, the performance information of the second electronic device 320 may include information on the battery level of the second electronic device 320. If the battery level of the second electronic device 320 is greater than or equal to a specified value, the second electronic device 320 may activate the second reception filter 447-2 or 457-2 corresponding to the second transmission filter 422.

According to various embodiments of the disclosure, the performance information of the second electronic device 320 may include information on the temperature of the second electronic device 320. The temperature of the second electronic device 320 may be a measured temperature of an element (e.g., an application processor) implemented in the second electronic device 320. If the temperature of the second electronic device 320 is less than or equal to a specified value, the second electronic device 320 may activate the second reception filters 447-2 and 457-2 corresponding to the second transmission filter 422.

According to various embodiments of the disclosure, the processor 520 may receive a second RTCP message indicating whether or not to perform the operation of pre-processing content using the second transmission filter from the first electronic device 400. In response to reception of the second RTCP message instructing to perform the operation of pre-processing content using the second transmission filter, the processor 520 may activate the second reception filter 522, and may perform an operation of post-processing content using the second reception filter 522. In response to determination to perform the operation of post-processing content using the second reception filter 522, the processor 520 may deactivate the first reception filter 521, and may activate the second reception filter 522. The processor 520 may transmit the received content to the first reception filter 521 until the second reception filter 522 is activated. The processor 520 may post-process the received content using the first reception filter 521, and may transmit the same to an output device (e.g., the speaker 327 in FIG. 3A or the display 357 in FIG. 3B). The processor 520 may transmit the received content to the second reception filter 522 after the second reception filter 522 is activated. The processor 520 may post-process the received content using the second reception filter 522, and may transmit the same to the speaker 327 or 357.

Although the above embodiment has been described on the assumption that the second electronic device 500 includes both the first reception filter 521 and the second reception filter 522, the second electronic device 500 may include only the second reception filter 522. In the case where the second electronic device 500 includes only the second reception filter 522, the second electronic device 500 may be implemented without the post-processing operation using the second transmission filter 522. The second electronic device 500 may receive content, which is not pre-processed, from a decoder (e.g., the decoder 323 in FIG. 3A or the decoder 353 in FIG. 3B). In response to reception of a second RTCP message instructing to perform the operation of pre-processing content using the second transmission filter from the first electronic device 400, the second electronic device 500 may determine whether or not to perform the operation of post-processing content using the second reception filter 522. In response to determination to perform the operation of post-processing content, the second electronic device 500 may activate the second reception filter 522, and may perform the operation of post-processing content using the second reception filter 522. The second electronic device 500 may transmit the received content to the output device (e.g., the speaker 327 in FIG. 3A or the display 357 in FIG. 3B) without post-processing the same until the second reception filter 522 is activated.

Figure 6:
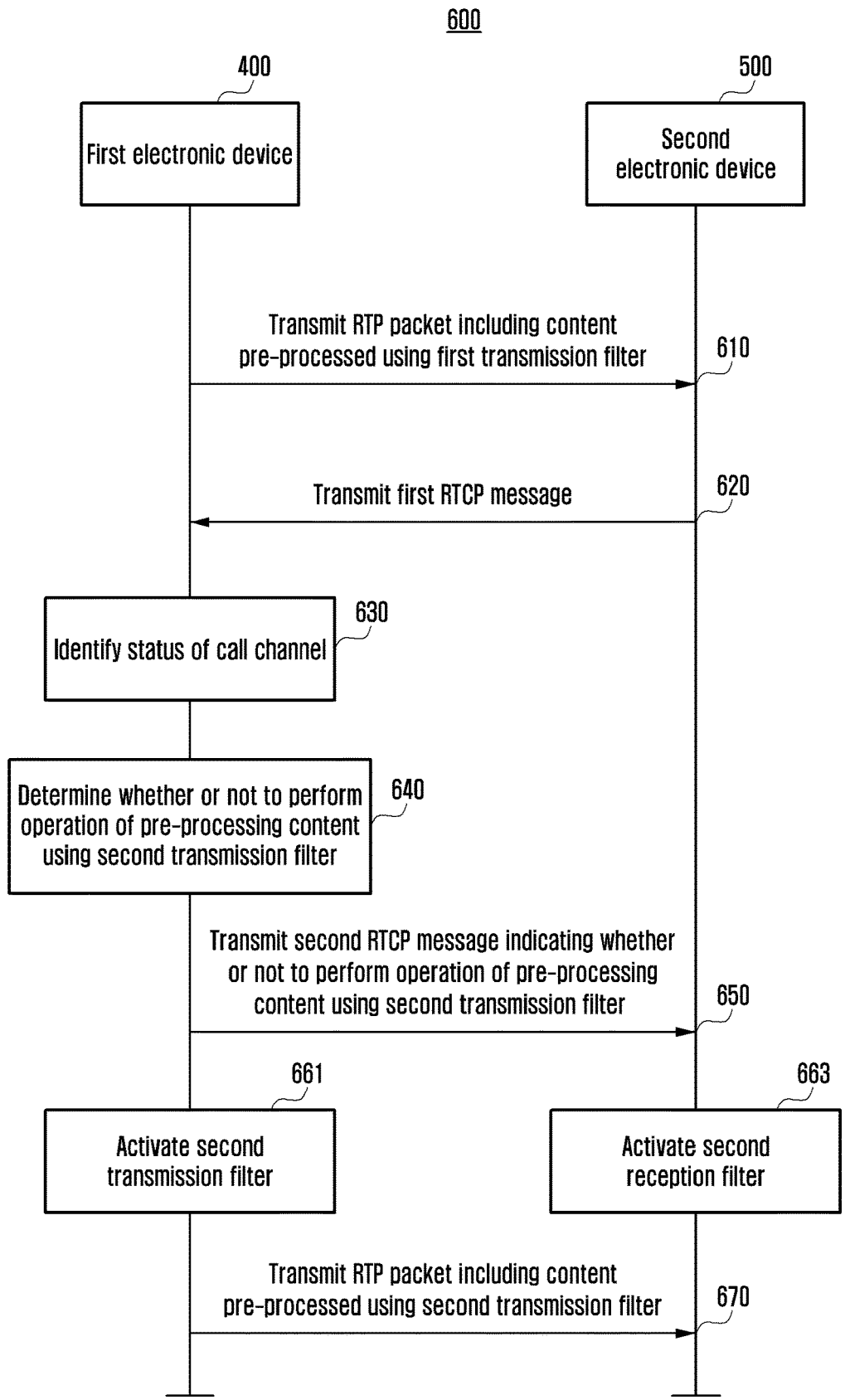
FIG. 6 is a flowchart illustrating an operation of determining whether or not to pre-process content using a second transmission filter when a first electronic device and a second electronic device are in a call-connected state according to an embodiment of the disclosure.

FIG. 6 is a flowchart 600 illustrating an operation of exchanging content between a first electronic device and a second electronic device according to an embodiment of the disclosure.

Referring to FIG. 6, in operation 610, a first electronic device (e.g., the first electronic device 310 in FIGS. 3A and 3B or the electronic device 400 in FIG. 4A) according to various embodiments may transmit an RTP packet including content pre-processed using a first transmission filter (e.g., the first transmission filter 421 in FIG. 4A) to a second electronic device (e.g., the second electronic device 320 in FIGS. 3A and 3B or the second electronic device 500 in FIG. 5).

According to various embodiments of the disclosure, the first electronic device 400 may include at least two or more transmission filters including a first transmission filter (e.g., the first transmission filter 421 in FIG. 4A) and a second transmission filter (e.g., the second transmission filter 422 in FIG. 4A). The second transmission filter 422 may be a filter capable of realizing a video of higher quality than the content pre-processed using the first transmission filter 421 in the operation of pre-processing content. The second transmission filter 422 may be a filter used in order for a neural processing unit of the first electronic device 400 to process voice data or video data.

According to various embodiments of the disclosure, the first electronic device 400 may perform the operation of pre-processing content using the first transmission filter 421, thereby converting the content so as to have quality specified through negotiation for call connection.

According to various embodiments of the disclosure, in operation 620, the second electronic device 500 may transmit a first real-time transport control protocol (RTCP) message including control information for controlling transmission or reception of the content to the first electronic device 400.

According to various embodiments of the disclosure, the first RTCP message may include information for identifying the status of a call channel between the first electronic device 400 and the second electronic device 320.

According to an embodiment of the disclosure, the first RTCP message may include one-way-delay (OWD) information indicating the time during which the packet (e.g., an RTP packet) transmitted by the first electronic device 400 or the second electronic device 500 stays in the call channel. The OWD information may include the difference between the time at which the first electronic device 400 transmits a specified packet and the time at which the second electronic device 500 receives the specified packet, or the difference between the time at which the second electronic device 500 transmits a specified packet and the time at which the first electronic device 400 receives the specified packet. An increase in the OWD information may indicate that the time for which the packet stays in the call channel increases, and an increase in the time for which the packet stays in the call channel may indicate that the status of the call channel is deteriorated. The OWD information may be included in the payload of a first RTCP message in a receiver report (RR) type or a sender report (SR) type.

According to an embodiment of the disclosure, the first RTCP message may include perceived bit-rate information, which is the ratio of the size of a packet transmitted from the first electronic device 400 (e.g., an RTP packet) to the size of the packet received by the second electronic device 500. If the size of the packet received by the second electronic device 500 is less than the size of the packet transmitted by the first electronic device 400, this may indicate that the status of the call channel is deteriorated. The perceived bit-rate information may be included in the payload of a first RTCP message in an application-specific (APP) type.

According to an embodiment of the disclosure, the first RTCP message may include a packet loss rate indicating a loss rate of a packet (e.g., an RTP packet) transmitted by the first electronic device 400 when the second electronic device 500 receives the packet transmitted from the first electronic device 400. An increase in the packet loss rate may indicate that the status of the call channel is deteriorated. The packet loss rate may be included in the payload of a first RTCP message in a receiver report (RR) type.

According to various embodiments of the disclosure, in operation 630, the first electronic device 400 may identify the status of the call channel, based on information indicating the status of the call channel, which is included in the first RTCP message.

According to various embodiments of the disclosure, in operation 640, the first electronic device 400 may determine whether or not to perform an operation of pre-processing content using the second transmission filter 422.

According to various embodiments of the disclosure, the first electronic device 400 may receive a first RTCP message every specified period while transmitting content to the second electronic device 500. The first electronic device 400 may identify the status of the call channel between the first electronic device 400 and the second electronic device 500 every specified period, based on the first RTCP message. The first electronic device 400 may identify whether or not the status of the call channel satisfies a specified condition. The specified condition may be a condition indicating that the status of the call channel is deteriorated. In response to identifying that the status of the call channel satisfies the specified condition, the first electronic device 400 may reduce the quality of content to be transmitted to the second electronic device 500 in order to increase the transmission rate of the content to be transmitted to the second electronic device 500. For example, in order to reduce the quality of the content to be transmitted to the second electronic device 500, the first electronic device 400 may reduce the resolution of the content or the frame rate of the content.

According to various embodiments of the disclosure, in order to reduce the size of the content to be transmitted to the second electronic device 500, the first electronic device 400 may reduce the resolution and/or frame rate of video content. In order to reduce the size of the content to be transmitted to the second electronic device 500, the first electronic device 400 may reduce the sound quality of voice content. In order to increase (or upscale) the quality of content having relatively low quality due to the status of the call channel, the first electronic device 400 may determine whether or not to perform the pre-processing of content using the second transmission filter 422.

According to various embodiments of the disclosure, the first electronic device 400 may determine whether or not to perform the operation of pre-processing content using the second transmission filter 422, based on the status of the call channel and the performance information of the second electronic device 500. The performance information of the second electronic device 500 may include performance information related to whether or not to support the second reception filter 522 corresponding to the second transmission filter 422.

According to various embodiments of the disclosure, the first electronic device 400 may receive a call connection response message including the performance information of the second electronic device 500 while establishing a call connection between the first electronic device 400 and the second electronic device 500, and may identify the performance information of the second electronic device 500 included in the call connection response message.

According to various embodiments of the disclosure, the first electronic device 400 may receive an RTCP message including the performance information of the second electronic device 500 after connecting a call channel between the first electronic device 400 and the second electronic device 500, and may identify the performance information of the second electronic device 500 included in the RTCP message. The RTCP message including the performance information of the second electronic device 500 may be the same message as the first RTCP message, or may be a different message from the first RTCP message.

According to various embodiments of the disclosure, in determining to perform the operation of pre-processing content using the second transmission filter 422, the first electronic device 400 may further consider performance information of the first electronic device 400 (e.g., the battery level of the first electronic device 400 or the temperature of the first electronic device 400).

According to various embodiments of the disclosure, in operation 650, in response to determination to perform the operation of pre-processing content using the second transmission filter 422, the first electronic device 400 may transmit a second RTCP message instructing to perform the operation of pre-processing content using the second transmission filter 422 to the second electronic device 500.

According to various embodiments of the disclosure, in operation 661, the first electronic device 400 may activate the second transmission filter 422. Activation of the second transmission filter 422 may denote that the voice data collected by a microphone (e.g., the microphone 311 in FIG. 3A) or the video data collected by a camera (e.g., the camera 341 in FIG. 3B) is input to the second transmission filter 422 and is pre-processed therein.

According to various embodiments of the disclosure, in operation 663, the second electronic device 500 may activate the second reception filter 522. Activation of the second reception filter 522 may denote that the content transmitted from the first electronic device 400 is decoded and the decoded data is then input to the second reception filter 522 and is post-processed therein.

According to various embodiments of the disclosure, in operation 670, the first electronic device 400 may transmit an RTP packet including the content pre-processed using the second transmission filter 422 to the second electronic device 500.

Figure 7:
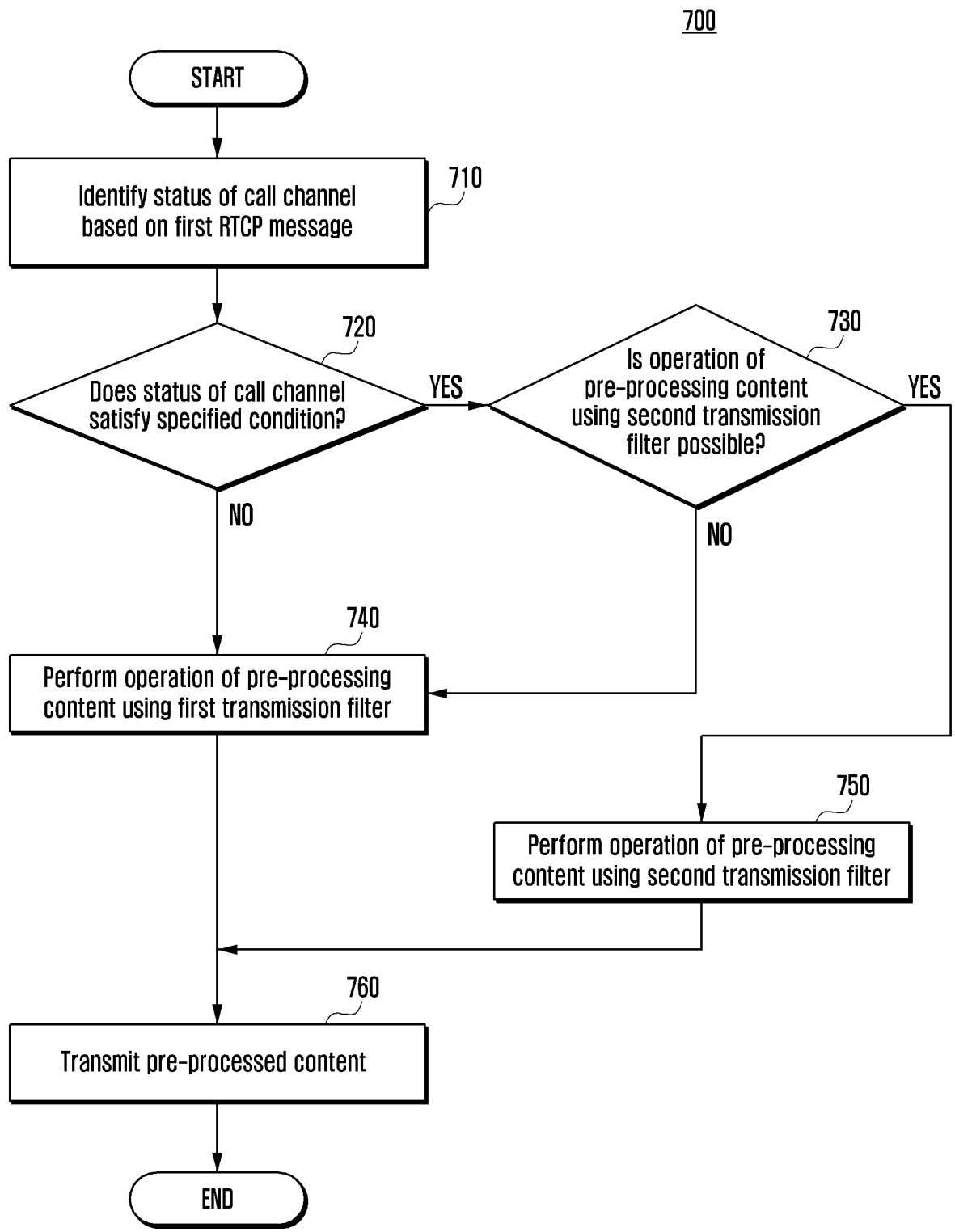
FIG. 7 is a flowchart illustrating an embodiment in which a first electronic device pre-processes content using one of a first transmission filter and a second transmission filter, based on a status of a call channel, according to an embodiment of the disclosure.

FIG. 7 is a flowchart 700 illustrating an embodiment in which a first electronic device pre-processes content using any one of a first transmission filter and a second transmission filter, based on a status of a call channel, according to an embodiment of the disclosure.

Referring to FIG. 7, in operation 710, a first electronic device (e.g., the first electronic device 400 in FIG. 4A) may identify the status of a call channel, based on information capable of identifying the status of the call channel, which is included in a first RTCP message.

According to various embodiments of the disclosure, the first RTCP message may include information for identifying the status of a call channel between the first electronic device 400 and the second electronic device 320.

According to an embodiment of the disclosure, the first RTCP message may include one-way-delay (OWD) information indicating the time during which the packet (e.g., an RTP packet) transmitted by the first electronic device 400 or the second electronic device 500 stays in the call channel. The OWD information may include the difference between the time at which the first electronic device 400 transmits a specified packet and the time at which the second electronic device 500 receives the specified packet, or the difference between the time at which the second electronic device 500 transmits a specified packet and the time at which the first electronic device 400 receives the specified packet. An increase in the OWD information may indicate that the time for which the packet stays in the call channel increases, and an increase in the time for which the packet stays in the call channel may indicate that the status of the call channel is deteriorated. The OWD information may be included in the payload of a first RTCP message in a receiver report (RR) type or a sender report (SR) type.

According to an embodiment of the disclosure, the first RTCP message may include perceived bit-rate information, which is the ratio of the size of a packet transmitted from the first electronic device 400 (e.g., an RTP packet) to the size of the packet received by the second electronic device 500. If the size of the packet received by the second electronic device 500 is less than the size of the packet transmitted by the first electronic device 400, this may indicate that the status of the call channel is deteriorated. The perceived bit-rate information may be included in the payload of a first RTCP message in an application-specific (APP) type.

According to an embodiment of the disclosure, the first RTCP message may include a packet loss rate indicating a loss rate of a packet (e.g., an RTP packet) transmitted by the first electronic device 400 when the second electronic device 500 receives the packet transmitted from the first electronic device 400. An increase in the packet loss rate may indicate that the status of the call channel is deteriorated. The packet loss rate may be included in the payload of a first RTCP message in a receiver report (RR) type.

According to various embodiments of the disclosure, in operation 720, the first electronic device 400 may identify whether or not the status of the call channel satisfies a specified condition.

According to various embodiments of the disclosure, the specified condition may be a condition indicating that the status of the call channel is deteriorated. In response to identifying that the status of the call channel satisfies the specified condition, the first electronic device 400 may reduce the quality of content to be transmitted to the second electronic device 500 in order to increase the transmission rate of the content to be transmitted to the second electronic device 500.

According to various embodiments of the disclosure, in operation 730, in response to identifying that the status of the call channel satisfies the specified condition ("YES" in operation 720), the first electronic device 400 may identify whether or not an operation of pre-processing content is possible using a second transmission filter (e.g., the second transmission filter 422 in FIG. 4A).

According to various embodiments of the disclosure, the first electronic device 400 may determine whether or not to perform an operation of pre-processing content using the second transmission filter 422, based on the status of the call channel and the performance information of the second electronic device 500. The performance information of the second electronic device 500 may include performance information related to whether or not to support a second reception filter 522 corresponding to the second transmission filter 422.

According to various embodiments of the disclosure, the first electronic device 400 may receive a call connection response message including the performance information of the second electronic device 500 while establishing a call connection between the first electronic device 400 and the second electronic device 500, and may identify the performance information of the second electronic device 500 included in the call connection response message.

According to various embodiments of the disclosure, the first electronic device 400 may receive an RTCP message including the performance information of the second electronic device 500 after connecting a call channel between the first electronic device 400 and the second electronic device 500, and may identify the performance information of the second electronic device 500 included in the RTCP message. The RTCP message including the performance information of the second electronic device 500 may be the same message as the first RTCP message, or may be a different message from the first RTCP message.

According to various embodiments of the disclosure, in determining to perform the operation of pre-processing content using the second transmission filter 422, the first electronic device 400 may further consider performance information of the first electronic device 400 (e.g., the battery level of the first electronic device 400 or the temperature of the first electronic device 400).

According to various embodiments of the disclosure, in operation 740, in response to identifying that the status of the call channel does not satisfy the specified condition ("NO" in operation 720) or that the operation of pre-processing content using the second transmission filter 422 is impossible ("NO" in operation 730), the first electronic device 400 may perform an operation of pre-processing content using the first transmission filter 421.

In relation to performing the operation of pre-processing content using the first transmission filter in operation 740, in response to identifying that the status of the call channel does not satisfy the specified condition ("NO" in operation 720) or that the operation of pre-processing content using the second transmission filter 422 is impossible ("NO" in operation 730), the first electronic device 400 may omit the operation of pre-processing content, and may transmit content of reduced quality to the second electronic device 500.

According to various embodiments of the disclosure, in operation 750, in response to identifying that the operation of pre-processing content using the second transmission filter 422 is possible ("YES" in operation 730), the first electronic device 400 may perform the operation of pre-processing content using the second transmission filter 422.

According to various embodiments of the disclosure, in operation 760, the first electronic device 400 may transmit an RTP packet including the content pre-processed using the second transmission filter 422 to the second electronic device 500.

An electronic device according to various embodiments of the disclosure may include a communication circuit configured to transmit or receive data using a call channel established through a call connection with an external electronic device, and a processor, wherein the processor may be configured to transmit content, which is pre-processed using a first transmission filter, to the external electronic device through the call channel, receive a first real-time control protocol (RTCP) message transmitted by the external electronic device through the call channel, identify status of the call channel, based on the first RTCP message, determine whether or not to perform an operation of pre-processing the content using a second transmission filter that pre-processes the content to be transmitted to the external electronic device, based on the status of the call channel and performance information of the external electronic device, transmit a second RTCP message indicating whether or not to perform the operation of pre-processing the content using the second transmission filter to the external electronic device, and perform transmission of the content, based on the second transmission filter.

In the electronic device according to various embodiments of the disclosure, the first RTCP message may include the performance information of the external electronic device, and the performance information of the external electronic device may include an indicator indicating whether or not there is a reception filter corresponding to the second transmission filter.

In the electronic device according to various embodiments of the disclosure, the content compression rate by the second transmission filter is higher than the content compression rate by the first transmission filter.

In the electronic device according to various embodiments of the disclosure, the processor may be configured to deactivate the first transmission filter and activate the second transmission filter in response to determination to perform the operation of pre-processing the content using the second transmission filter.

In the electronic device according to various embodiments of the disclosure, the processor may be configured to identify one or more values indicating the status of the call channel, based on the first RTCP message, and may be configured to determine to perform the operation of pre-processing the content using the second transmission filter in response to identifying that the value indicating the status of the call channel satisfies a specified condition.

In the electronic device according to various embodiments of the disclosure, the processor may be configured to determine whether or not to perform the operation of pre-processing the content using the second transmission filter, based on the status of the call channel, the performance information of the external electronic device, and performance information of the electronic device.

In the electronic device according to various embodiments of the disclosure, the performance information of the electronic device may include temperature information of the electronic device, and the processor may be configured to determine to perform the operation of pre-processing the content using the second transmission filter in response to identifying that the temperature of the electronic device, which is identified based on the temperature information, is less than or equal to a specified temperature.

In the electronic device according to various embodiments of the disclosure, the performance information of the electronic device may include a battery level of the electronic device.

In the electronic device according to various embodiments of the disclosure, the processor may be configured to determine to perform the operation of pre-processing the content using the second transmission filter in response to identifying that the battery level of the electronic device is greater than or equal to a specified value.

In the electronic device according to various embodiments of the disclosure, the processor may be configured to transmit a call connection request message for establishing a call channel between the external electronic device and the electronic device, and receive a response message including the performance information of the external electronic device from the external electronic device.

Figure 8:
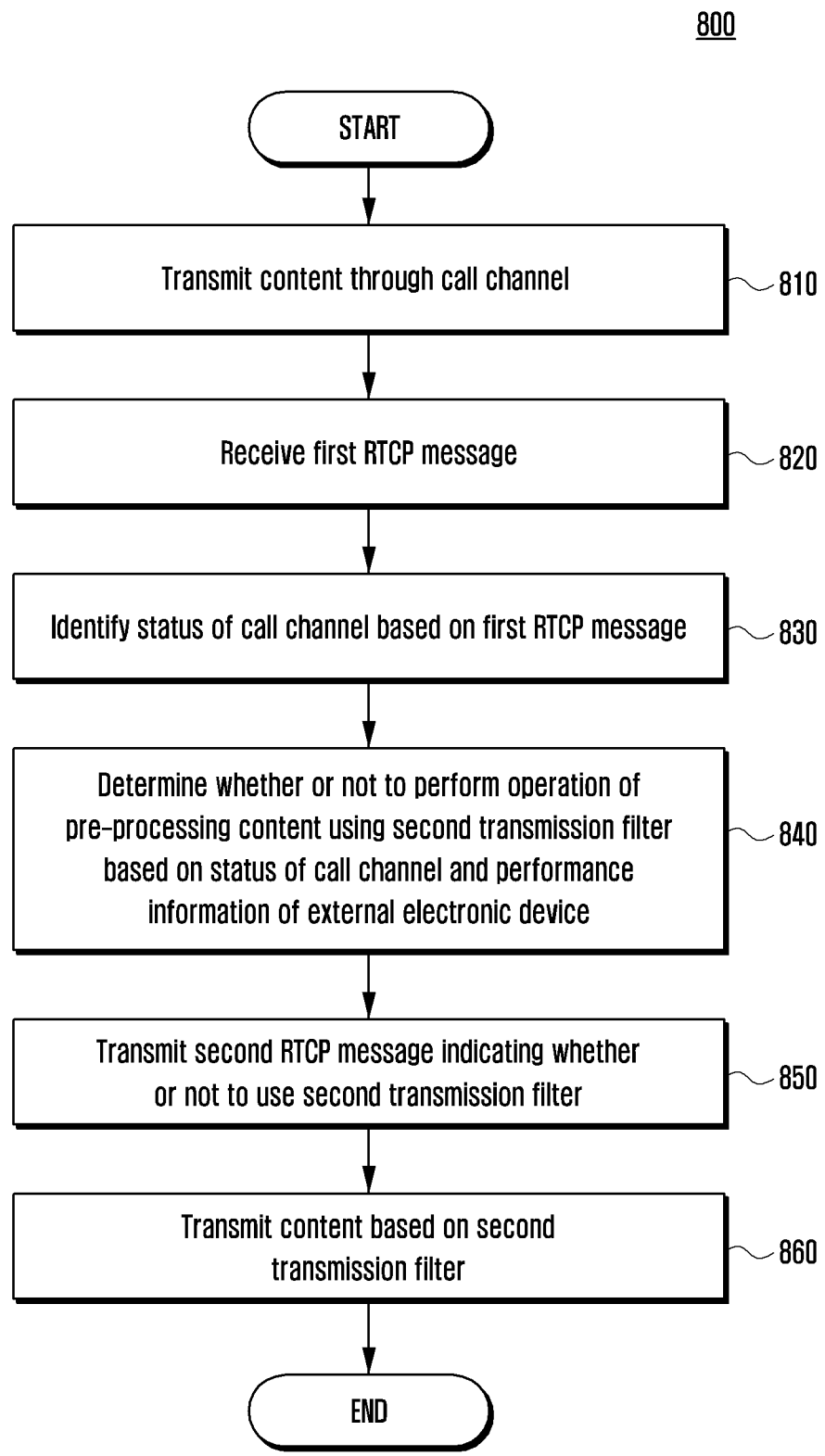
FIG. 8 is a flowchart illustrating a method of operating an electronic device according to an embodiment of the disclosure.

FIG. 8 is a flowchart 800 illustrating a method of operating an electronic device according to an embodiment of the disclosure.

Referring to FIG. 8, in operation 810, a first electronic device (e.g., the first electronic device 310 in FIGS. 3A and 3B or the electronic device 400 in FIG. 4A) according to various embodiments may transmit an RTP packet including content pre-processed using a first transmission filter (e.g., the first transmission filter 421 in FIG. 4A) to a second electronic device (e.g., the second electronic device 320 in FIGS. 3A and 3B or the second electronic device 500 in FIG. 5).

According to various embodiments of the disclosure, the first electronic device 400 may include at least two or more transmission filters including a first transmission filter (e.g., the first transmission filter 421 in FIG. 4A) and a second transmission filter (e.g., the second transmission filter 422 in FIG. 4A). In an operation of pre-processing content, the second transmission filter 422 may be a filter capable of realizing a video having higher quality than the content pre-processed using the first transmission filter 421. The second transmission filter 422 may be a filter used in order for a neural processing unit of the first electronic device 400 to process voice data or video data.

According to various embodiments of the disclosure, the first electronic device 400 may perform the operation of pre-processing content using the first transmission filter 421, thereby converting the content so as to have quality specified through negotiation for call connection.

According to various embodiments of the disclosure, in operation 820, the first electronic device 400 may receive, from the second electronic device 500, a first real-time transport control protocol (RTCP) message including control information for controlling transmission or reception of content.

According to various embodiments of the disclosure, the first RTCP message may include information for identifying the status of a call channel between the first electronic device 400 and the second electronic device 320.

According to an embodiment of the disclosure, the first RTCP message may include one-way-delay (OWD) information indicating the time during which the packet (e.g., an RTP packet) transmitted by the first electronic device 400 or the second electronic device 500 stays in the call channel. The OWD information may include the difference between the time at which the first electronic device 400 transmits a specified packet and the time at which the second electronic device 500 receives the specified packet, or the difference between the time at which the second electronic device 500 transmits a specified packet and the time at which the first electronic device 400 receives the specified packet. An increase in the OWD information may indicate that the time for which the packet stays in the call channel increases, and an increase in the time for which the packet stays in the call channel may indicate that the status of the call channel is deteriorated. The OWD information may be included in the payload of a first RTCP message in a receiver report (RR) type or a sender report (SR) type.

According to an embodiment of the disclosure, the first RTCP message may include perceived bit-rate information, which is the ratio of the size of a packet transmitted from the first electronic device 400 (e.g., an RTP packet) to the size of the packet received by the second electronic device 500. If the size of the packet received by the second electronic device 500 is less than the size of the packet transmitted by the first electronic device 400, this may indicate that the status of the call channel is deteriorated. The perceived bit-rate information may be included in the payload of a first RTCP message in an application-specific (APP) type.

According to an embodiment of the disclosure, the first RTCP message may include a packet loss rate indicating a loss rate of a packet (e.g., an RTP packet) transmitted by the first electronic device 400 when the second electronic device 500 receives the packet transmitted from the first electronic device 400. An increase in the packet loss rate may indicate that the status of the call channel is deteriorated. The packet loss rate may be included in the payload of a first RTCP message in a receiver report (RR) type.

According to various embodiments of the disclosure, in operation 830, the first electronic device 400 may identify the status of the call channel, based on information indicating the status of the call channel, which is included in the first RTCP message.

According to various embodiments of the disclosure, in operation 840, the first electronic device 400 may determine whether or not to perform an operation of pre-processing content using the second transmission filter 422.

According to various embodiments of the disclosure, the first electronic device 400 may receive a first RTCP message every specified period while transmitting content to the second electronic device 500. The first electronic device 400 may identify the status of the call channel between the first electronic device 400 and the second electronic device 500 every specified period, based on the first RTCP message. The first electronic device 400 may identify whether or not the status of the call channel satisfies a specified condition. The specified condition may be a condition indicating that the status of the call channel is deteriorated. In response to identifying that the status of the call channel satisfies the specified condition, the first electronic device 400 may reduce the quality of content to be transmitted to the second electronic device 500 in order to increase the transmission rate of the content to be transmitted to the second electronic device 500. For example, in order to reduce the quality of the content to be transmitted to the second electronic device 500, the first electronic device 400 may reduce the resolution of the content or frame rate of the content.

According to various embodiments of the disclosure, in order to reduce the size of the content to be transmitted to the second electronic device 500, the first electronic device 400 may reduce the resolution and/or frame rate of video content. In order to reduce the size of the content to be transmitted to the second electronic device 500, the first electronic device 400 may reduce the sound quality of voice content. In order to increase (or upscale) the quality of content having relatively low quality due to the status of the call channel, the first electronic device 400 may determine whether or not to perform the pre-processing of content using the second transmission filter 422.

According to various embodiments of the disclosure, the first electronic device 400 may determine whether or not to perform the operation of pre-processing content using the second transmission filter 422, based on the status of the call channel and the performance information of the second electronic device 500. The performance information of the second electronic device 500 may include performance information related to whether or not to support the second reception filter 522 corresponding to the second transmission filter 422.

According to various embodiments of the disclosure, the first electronic device 400 may receive a call connection response message including the performance information of the second electronic device 500 while establishing a call connection between the first electronic device 400 and the second electronic device 500, and may identify the performance information of the second electronic device 500 included in the call connection response message.

According to various embodiments of the disclosure, the first electronic device 400 may receive an RTCP message including the performance information of the second electronic device 500 after connecting a call channel between the first electronic device 400 and the second electronic device 500, and may identify the performance information of the second electronic device 500 included in the RTCP message. The RTCP message including the performance information of the second electronic device 500 may be the same message as the first RTCP message, or may be a different message from the first RTCP message.

According to various embodiments of the disclosure, in determining to perform the operation of pre-processing content using the second transmission filter 422, the first electronic device 400 may further consider performance information of the first electronic device 400 (e.g., the battery level of the first electronic device 400 or the temperature of the first electronic device 400).

According to various embodiments of the disclosure, in operation 850, the first electronic device 400 may transmit a second RTCP message instructing to perform the operation of pre-processing content using the second transmission filter 422 to the second electronic device 500.

According to various embodiments of the disclosure, in operation 860, the first electronic device 400 may transmit content pre-processed using the second transmission filter 422 to the second electronic device 500.

A method of operating an electronic device according to various embodiments of the disclosure may include transmitting content, which is pre-processed using a first transmission filter, to an external electronic device through a call channel established between the external electronic device and the electronic device, receiving a first real-time control protocol (RTCP) message from the external electronic device through the call channel, identifying status of the call channel, based on the first RTCP message, determining whether or not to perform an operation of pre-processing the content using a second transmission filter that pre-processes the content to be transmitted to the external electronic device, based on the status of the call channel and performance information of the external electronic device, transmitting a second RTCP message indicating whether or not to use the second transmission filter to the external electronic device, and performing transmission of the content, based on the second transmission filter.

In the method of operating an electronic device according to various embodiments of the disclosure, the first RTCP message may include the performance information of the external electronic device, and the performance information of the external electronic device may include an indicator indicating whether or not there is a reception filter corresponding to the second transmission filter.

In the method of operating an electronic device according to various embodiments of the disclosure, the content compression rate by the second transmission filter is higher than the content compression rate by the first transmission filter.

The method of operating an electronic device according to various embodiments of the disclosure may further include deactivating the first transmission filter and activating the second transmission filter in response to determination to perform the operation of pre-processing the content using the second transmission filter.

In the method of operating an electronic device according to various embodiments of the disclosure, the determining of whether or not to perform the operation of pre-processing the content may include identifying one or more values indicating the status of the call channel, based on the first RTCP message, and determining to perform the operation of pre-processing the content using the second transmission filter in response to identifying that the value indicating the status of the call channel satisfies a specified condition.

In the method of operating an electronic device according to various embodiments of the disclosure, the determining of whether or not to perform the operation of pre-processing the content may include determining whether or not to perform the operation of pre-processing the content using the second transmission filter, based on the status of the call channel, the performance information of the external electronic device, and performance information of the electronic device.

In the method of operating an electronic device according to various embodiments of the disclosure, the performance information of the electronic device may include temperature information of the electronic device, and the determining of whether or not to perform the operation of pre-processing the content may include determining whether or not to perform the operation of pre-processing the content using the second transmission filter in response to identifying that the temperature of the electronic device, which is identified based on the temperature information, is less than or equal to a specified temperature.

In the method of operating an electronic device according to various embodiments of the disclosure, the performance information of the electronic device may include a battery level of the electronic device.

In the method of operating an electronic device according to various embodiments of the disclosure, the determining of whether or not to perform the operation of pre-processing the content may include determining whether or not to perform the operation of pre-processing the content using the second transmission filter in response to identifying that the battery level of the electronic device is greater than or equal to a specified value.

The method of operating an electronic device according to various embodiments of the disclosure may further include transmitting a call connection request message for establishing a call channel between the external electronic device and the electronic device, and receiving a response message including the performance information of the external electronic device from the external electronic device.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication circuit configured to transmit or receive data using a call channel established through a call connection with an external electronic device; and
a processor configured to:
transmit content, which is pre-processed using a first transmission filter, to the external electronic device through the call channel,
receive a first real-time transport control protocol (RTCP) message transmitted by the external electronic device through the call channel,
identify a status of the call channel, based on the first RTCP message, determine whether or not to perform an operation of pre-processing the content to be transmitted to the external electronic device using a second transmission filter, based on the status of the call channel and an indicator indicating whether the external electronic device performs an operation of post-processing the content using a reception filter corresponding to the second transmission filter, the indicator being included in performance information of the external electronic device, transmit a second RTCP message indicating whether or not to perform the operation of pre-processing the content using the second transmission filter to the external electronic device, and perform transmission of the content, based on the second transmission filter.

2. The electronic device of claim 1,
wherein the first RTCP message comprises the performance information of the external electronic device.

3. The electronic device of claim 1, wherein a content compression rate by the second transmission filter is higher than the content compression rate by the first transmission filter.

4. The electronic device of claim 1, wherein the processor is further configured, in response to determination to perform the operation of pre-processing the content using the second transmission filter, to deactivate the first transmission filter and activate the second transmission filter.

5. The electronic device of claim 1, wherein the processor is further configured to:
based on the first RTCP message, identify one or more values indicating the status of the call channel, and
in response to identifying that the value indicating the status of the call channel satisfies a specified condition, determine to perform the operation of pre-processing the content using the second transmission filter.

6. The electronic device of claim 1, wherein the processor is further configured to determine whether or not to perform the operation of pre-processing the content using the second transmission filter, based on the status of the call channel, the performance information of the external electronic device, and performance information of the electronic device.

7. The electronic device of claim 6,
wherein the performance information of the electronic device comprises temperature information of the electronic device, and
wherein the processor is further configured to determine to perform the operation of pre-processing the content using the second transmission filter in response to identifying that the temperature of the electronic device, which is identified based on the temperature information, is less than or equal to a specified temperature.

8. The electronic device of claim 1, wherein the performance information of the electronic device comprises a battery level of the electronic device.

9. The electronic device of claim 8, wherein the processor is further configured to determine to perform the operation of pre-processing the content using the second transmission filter in response to identifying that the battery level of the electronic device is greater than or equal to a specified value.

10. The electronic device of claim 1, wherein the processor is further configured to:
transmit a call connection request message for establishing the call channel between the external electronic device and the electronic device, and receive a response message including the performance information of the external electronic device from the external electronic device.

11. A method of operating an electronic device, the method comprising:
transmitting content, which is pre-processed using a first transmission filter, to an external electronic device through a call channel established between the external electronic device and the electronic device;
receiving a first real-time transport control protocol (RTCP) message from the external electronic device through the call channel;
identifying a status of the call channel, based on the first RTCP message;
determining whether or not to perform an operation of pre-processing the content to be transmitted to the external electronic device using a second transmission filter, based on the status of the call channel and an indicator indicating whether the external electronic device performs an operation of post-processing the content using a reception filter corresponding to the second transmission filter, the indicator being included in performance information of the external electronic device;
transmitting a second RTCP message indicating whether or not to use the second transmission filter to the external electronic device; and
performing transmission of the content, based on the second transmission filter.

12. The method of claim 11,
wherein the first RTCP message comprises the performance information of the external electronic device.

13. The method of claim 11, wherein a content compression rate by the second transmission filter is higher than the content compression rate by the first transmission filter.

14. The method of claim 11, further comprising, in response to determination to perform the operation of pre-processing the content using the second transmission filter:
deactivating the first transmission filter; and
activating the second transmission filter.

15. The method of claim 11, wherein the determining of whether or not to perform the operation of pre-processing the content comprises:
based on the first RTCP message, identifying one or more values indicating the status of the call channel, and
in response to identifying that the value indicating the status of the call channel satisfies a specified condition, determining to perform the operation of pre-processing the content using the second transmission filter.

16. The method of claim 11, wherein the determining of whether or not to perform the operation of pre-processing the content comprises determining whether or not to perform the operation of pre-processing the content using the second transmission filter, based on the status of the call channel, the performance information of the external electronic device, and performance information of the electronic device.

17. The method of claim 16,
wherein the performance information of the electronic device comprises temperature information of the electronic device, and
wherein the determining of whether or not to perform the operation of pre-processing the content comprises determining whether or not to perform the operation of pre-processing the content using the second transmission filter in response to identifying that the temperature of the electronic device, which is identified based on the temperature information, is less than or equal to a specified temperature.

18. The method of claim 11, wherein the performance information of the electronic device comprises a battery level of the electronic device.

19. The method of claim 18, wherein the determining of whether or not to perform the operation of pre-processing the content comprises determining whether or not to perform the operation of pre-processing the content using the second transmission filter in response to identifying that the battery level of the electronic device is greater than or equal to a specified value.

20. The method of claim 11, further comprising:
transmitting a call connection request message for establishing a call channel between the external electronic device and the electronic device; and
receiving a response message including the performance information of the external electronic device from the external electronic device.

21. The electronic device of claim 1, wherein the status of the call channel includes deterioration of the call channel.

* * * * *